(12) United States Patent
Djenguerian et al.

(10) Patent No.: US 9,331,587 B2
(45) Date of Patent: May 3, 2016

(54) POWER CONVERTER CONTROLLER WITH MULTIPLE POWER SOURCES

(71) Applicant: Power Integrations, Inc., San Jose, CA (US)

(72) Inventors: Alex B. Djenguerian, Saratoga, CA (US); Sheng Liu, San Jose, CA (US); Leif Lund, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 29 days.

(21) Appl. No.: 13/747,089

(22) Filed: Jan. 22, 2013

(65) Prior Publication Data

US 2014/0204624 A1    Jul. 24, 2014

(51) Int. Cl.
*H02M 3/335* (2006.01)
*H02M 1/00* (2006.01)

(52) U.S. Cl.
CPC ...... *H02M 3/33523* (2013.01); *H02M 3/33592* (2013.01); *H02M 2001/0006* (2013.01); *Y02B 70/1475* (2013.01)

(58) Field of Classification Search
None
See application file for complete search history.

(56) References Cited

U.S. PATENT DOCUMENTS

| 5,162,970 | A | 11/1992 | Davis, Jr. et al. |
| 5,650,357 | A | 7/1997 | Dobkin et al. |
| 5,926,373 | A * | 7/1999 | Stevens .......................... 361/704 |
| 6,229,721 | B1 * | 5/2001 | Mano et al. .................. 363/56.1 |
| 6,384,478 | B1 | 5/2002 | Pour |
| 6,456,511 | B1 * | 9/2002 | Wong .......................... 363/21.13 |
| 6,667,605 | B2 * | 12/2003 | Balakrishnan et al. ....... 323/277 |
| 6,998,952 | B2 | 2/2006 | Zhou et al. |
| 7,468,547 | B2 | 12/2008 | Harvey |
| 7,524,731 | B2 | 4/2009 | Wang |
| 7,619,297 | B2 | 11/2009 | Wang |
| 7,868,431 | B2 | 1/2011 | Feng et al. |
| 7,884,696 | B2 | 2/2011 | Hébert et al. |
| 8,093,983 | B2 | 1/2012 | Fouquet et al. |
| 8,772,909 | B1 | 7/2014 | Vinciarelli |
| 2004/0214376 | A1 | 10/2004 | Gibson et al. |
| 2005/0271148 | A1 | 12/2005 | Dupuis |
| 2010/0226151 | A1 * | 9/2010 | Chen et al. .................. 363/21.12 |
| 2013/0033903 | A1 * | 2/2013 | Teggatz et al. .................. 363/16 |

FOREIGN PATENT DOCUMENTS

JP        H09260569 A    10/1997

\* cited by examiner

*Primary Examiner* — Timothy J Dole
*Assistant Examiner* — Monica Mata
(74) *Attorney, Agent, or Firm* — Blakely Sokoloff Taylor & Zafman LLP

(57) ABSTRACT

A controller includes a bypass terminal, a first power circuit, a second power circuit, and a charging control circuit. The bypass terminal is to be coupled to a bypass capacitor coupled to a secondary side of an isolated power converter. The first power circuit is coupled to the bypass terminal and a first terminal to be coupled to a first node of the secondary side. The first power circuit transfers charge from the first terminal to the bypass terminal for storage on the bypass capacitor. The second power circuit is coupled to the bypass terminal and a second terminal to be coupled to a second node of the secondary side. The second power circuit transfers charge from the second terminal to the bypass terminal for storage on the bypass capacitor. The charging control circuit controls which of the first and second power circuits transfers charge to the bypass terminal.

22 Claims, 10 Drawing Sheets

POWER CONVERTER CONTROLLER WITH MULTIPLE POWER SOURCES

BACKGROUND INFORMATION

1. Field of the Disclosure

The disclosure relates to power converters, and more particularly, to control circuits for isolated power converters.

2. Background

Switch mode power converters are widely used in household and industrial appliances for converting a low frequency (e.g., 50 Hz or 60 Hz) high voltage alternating current (ac) input voltage to a required level of direct current (dc) output voltage. For example, switch mode power converters may be included in commonly used electronic devices, such as battery chargers for mobile electronic devices. Various types of switch mode power converters are popular because of their well regulated output, high efficiency, and small size along with their safety and protection features. Popular topologies of switch mode power converters include flyback, forward, push-pull, and full bridge, among many others including resonant types.

A challenge in the market of switch mode power converters is improving the efficiency of the power converter while maintaining high performance. A typical power converter may include a variety of circuit components that dissipate power during operation. For example, power converters may include control circuits that sense output voltage and control power switching in the switch mode power converter to regulate the output voltage to a desired value. Some circuit components of the power converter (e.g., the control circuits) may be powered from a voltage level that is greater than required for proper operation. Powering circuit components of the power converter using a voltage level that is greater than required may lead to excess power dissipation and reduction in the overall efficiency of the power converter.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
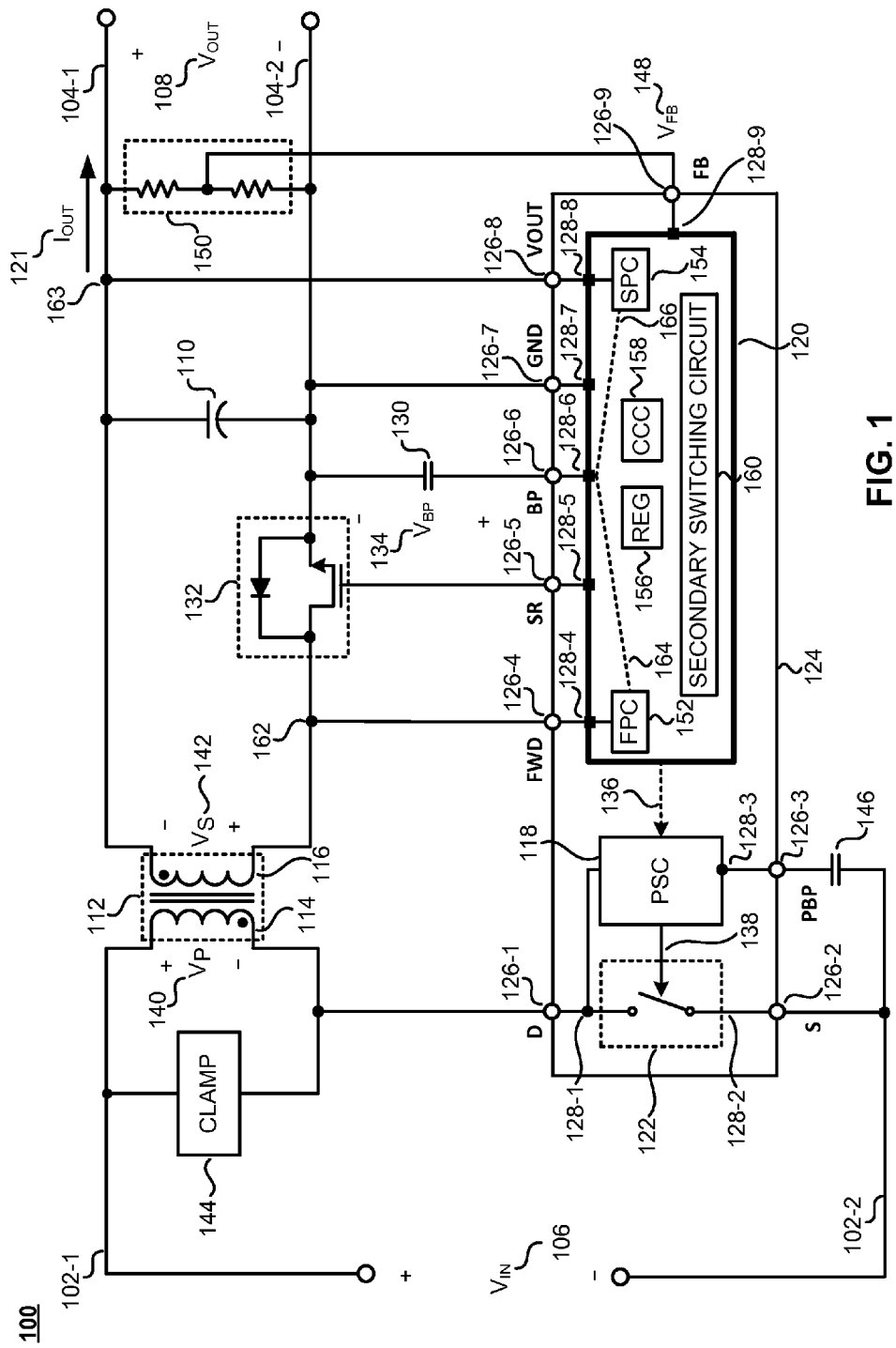
FIG. 1 is a schematic diagram of an example isolated power converter including a primary controller, secondary controller, and power switch according to the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in commercially feasible embodiments are often not depicted in order to facilitate a less obstructed view of the various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

An isolated power converter according to the present disclosure includes a primary controller and a secondary controller that are galvanically isolated from one another by an energy transfer element (e.g., a coupled inductor). In other words, a dc voltage applied between input side and output side will produce substantially zero current.

The primary controller is coupled to control a power switch on the primary side of the isolated power converter to control the transfer of energy from the primary winding of the energy transfer element to the secondary winding of the energy transfer element. The secondary controller is coupled to circuit components on the secondary side of the isolated power converter. Although the primary controller and the secondary controller are galvanically isolated from one another, the secondary controller may transmit a signal to the primary controller that controls how the primary controller switches the power switch to transfer energy to the secondary side.

The secondary side of the isolated power converter includes a bypass capacitor that provides operating power to circuits of the secondary controller. The secondary controller of the present disclosure may charge the bypass capacitor from multiple nodes of the secondary side in order to regulate the bypass voltage across the bypass capacitor at a sufficient level to operate circuits of the secondary controller. In one example described herein, the secondary controller may charge the bypass capacitor from a first node connected to the secondary winding and a second node connected to the output of the isolated power converter.

The secondary controller may select which of the first and second nodes charges the bypass capacitor in response to a variety of different operating conditions, such as the magnitude of the bypass voltage and/or the magnitude of the output voltage at the second node. In general, the secondary controller may use the first node to charge the bypass capacitor to a regulated bypass voltage when the output voltage at the second node is insufficient to charge the bypass capacitor to the regulated bypass voltage. The secondary controller may transition from using the first node to using the second node when the output voltage at the second node increases to a level that is sufficient to charge the bypass capacitor to the regulated bypass voltage.

During startup of the isolated power converter, when the output voltage is increasing from an initial value of zero volts, the secondary controller may use the secondary winding voltage developed at the first node to charge the bypass capacitor. The secondary controller may use the secondary winding voltage during startup because the output voltage of the isolated power converter may initially be at an insufficient level for charging the bypass capacitor. During startup, the output voltage of the isolated power converter may increase in response to the voltage developed at the secondary winding. After a period of time, the output voltage of the isolated power converter increases to a level that is sufficient for charging the bypass capacitor. The secondary controller may transition from charging the bypass capacitor using the first node to charging the bypass capacitor using the second node when the output voltage has reached a level that is sufficient for charging the bypass capacitor.

During normal operation of the isolated power converter, the output voltage of the power converter may be regulated at a level that is sufficient for charging the bypass capacitor. Accordingly, the secondary controller may continue to charge the bypass capacitor from the secondary node during normal operation of the isolated power converter. However, in some circumstances, excessive loading at the output of the isolated power converter may cause the output voltage to drop to a level that is insufficient for charging the bypass capacitor. When the output voltage drops, the secondary controller may transition from charging the bypass capacitor using the second node back to charging the bypass capacitor using the first node at the secondary winding. The secondary controller may then transition back to charging the bypass capacitor using the second node in response to the output voltage reaching a level that is sufficient to charge the bypass capacitor.

The ability of the secondary controller to select between multiple power sources may provide for efficient bypass capacitor charging because the secondary controller may charge from a relatively lower voltage (e.g., the output voltage) during typical operation of the isolated power converter. The ability to select between multiple power sources may also provide for reliable charging of the bypass capacitor because the secondary controller may switch to a higher charging voltage (e.g., the secondary winding) in the event that the lower charging voltage (e.g., the output voltage) of the isolated power converter drops during operation.

Figure 2:
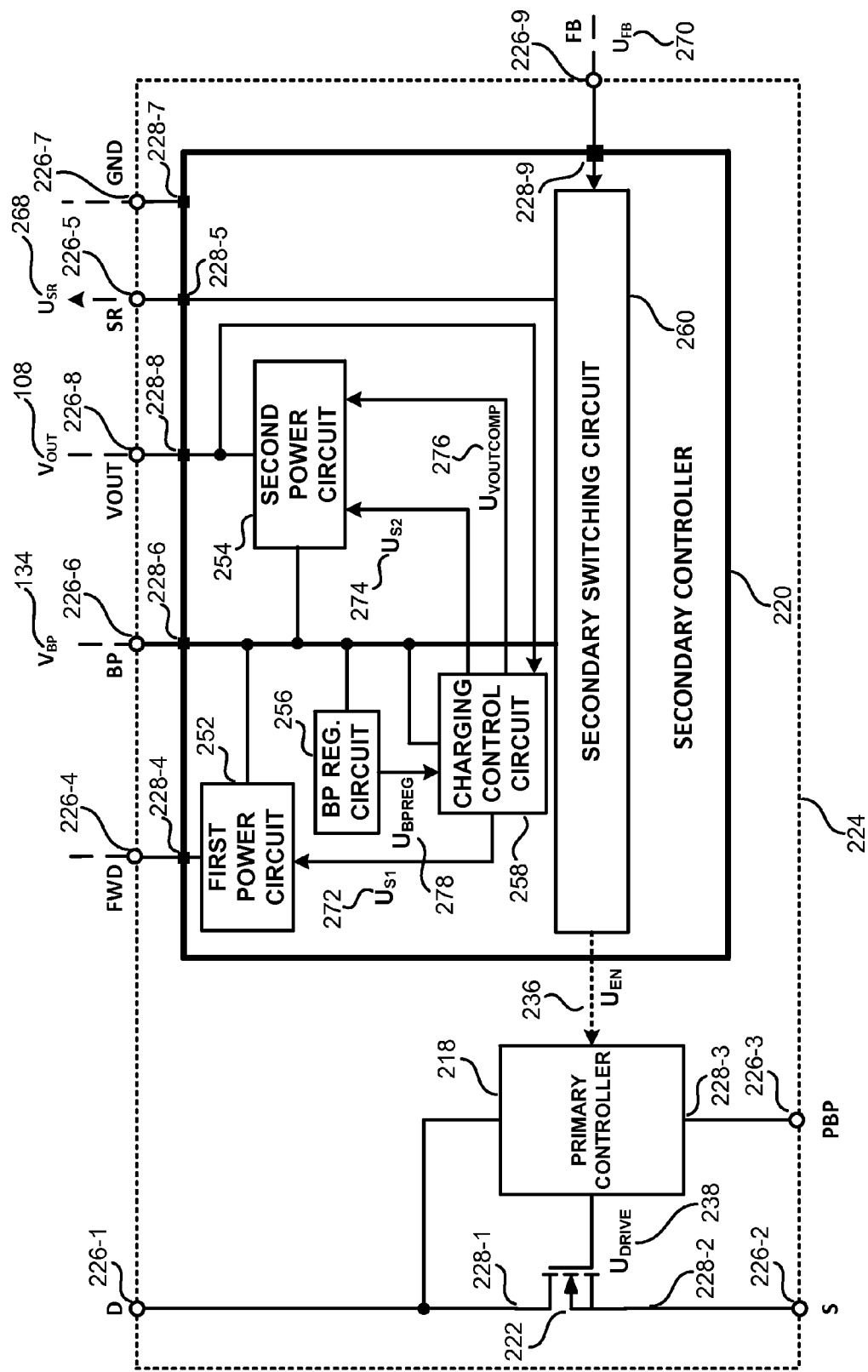
FIG. 2 is a functional block diagram of an example integrated circuit package that includes an example primary controller, an example secondary controller, and an example power switch according to the present disclosure.
Figure 3A:
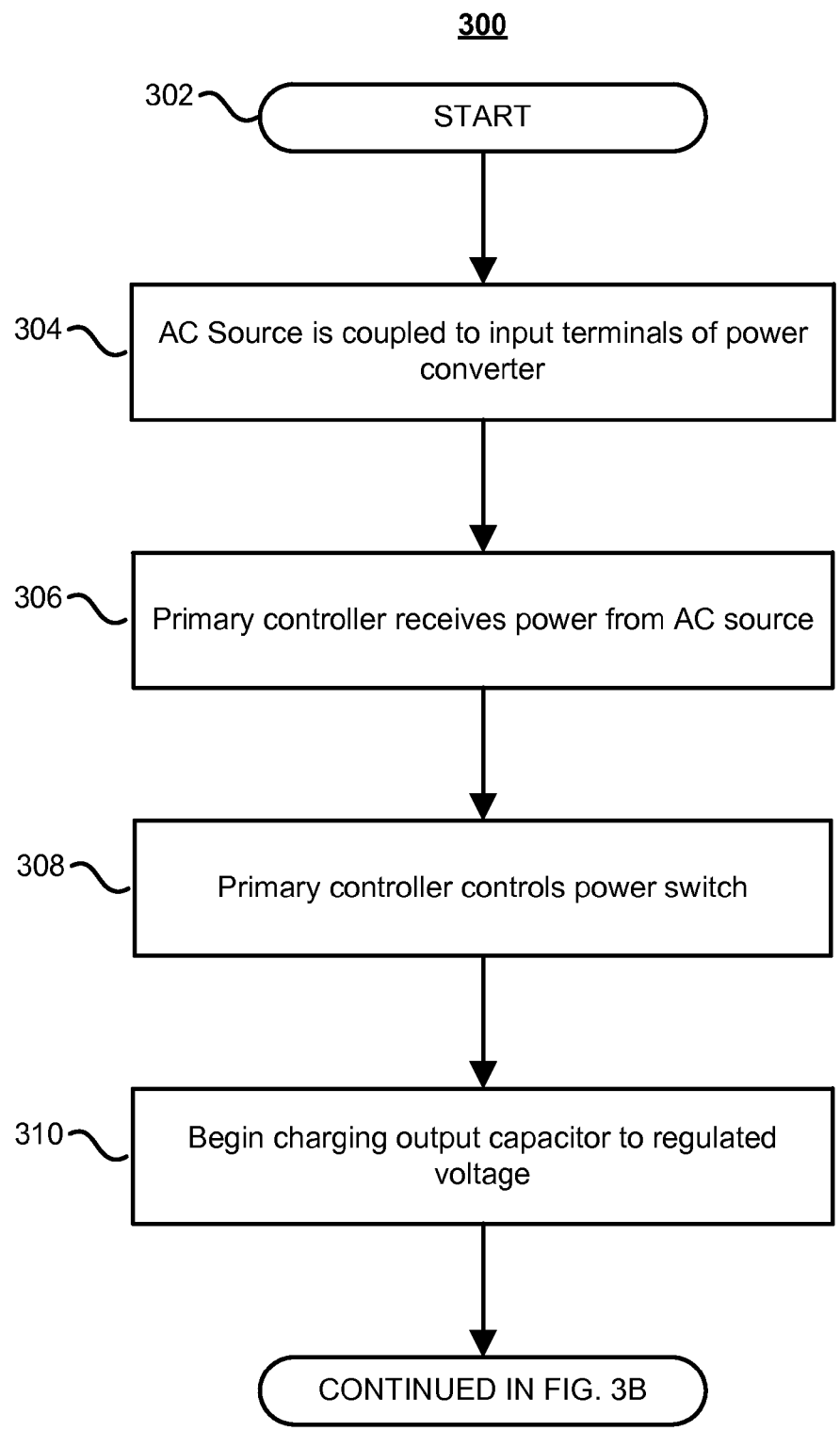
FIGS. 3A-3B are flow diagrams of an example method for controlling an isolated power converter during startup according to the present disclosure.
Figure 3B:
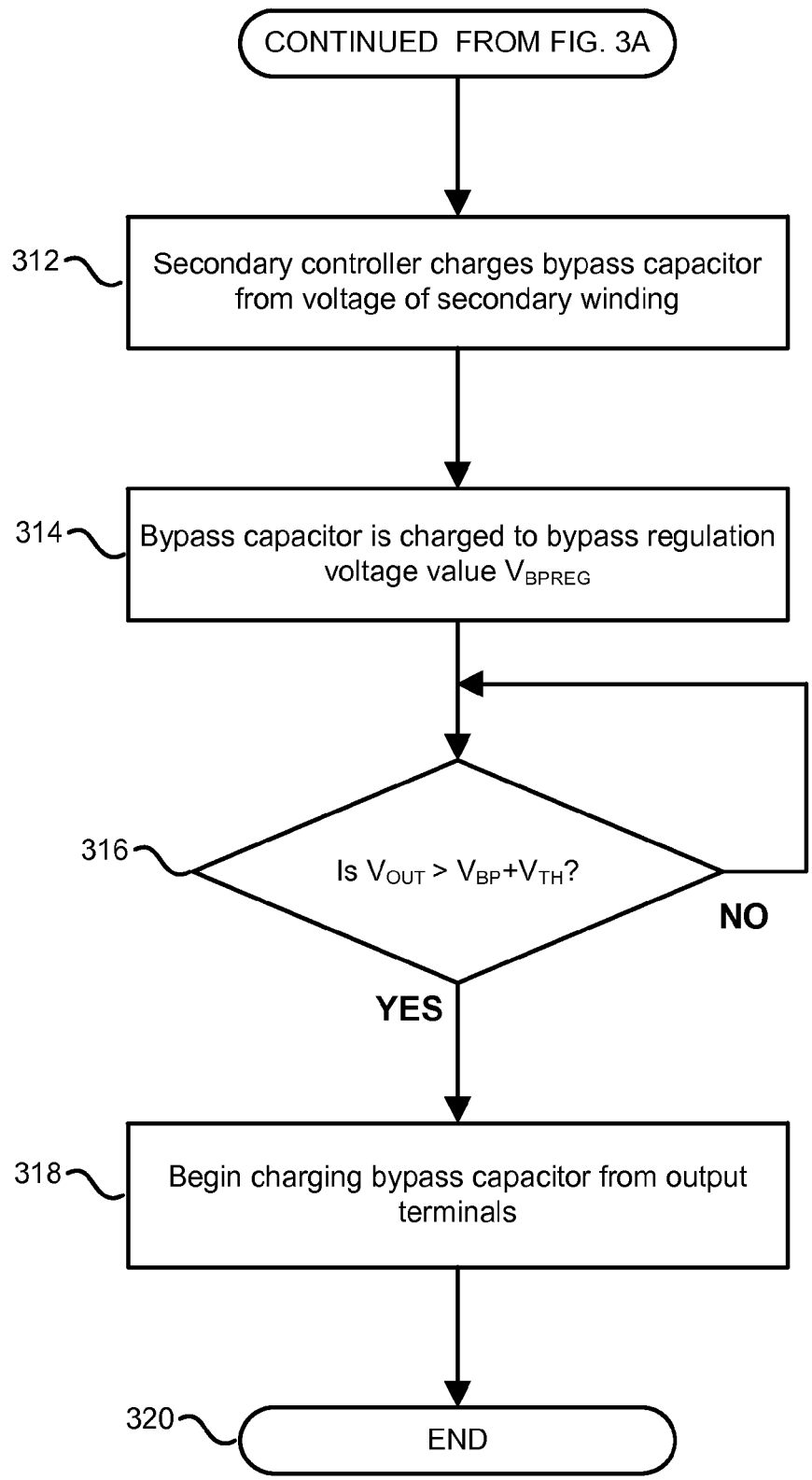
Figure 4:
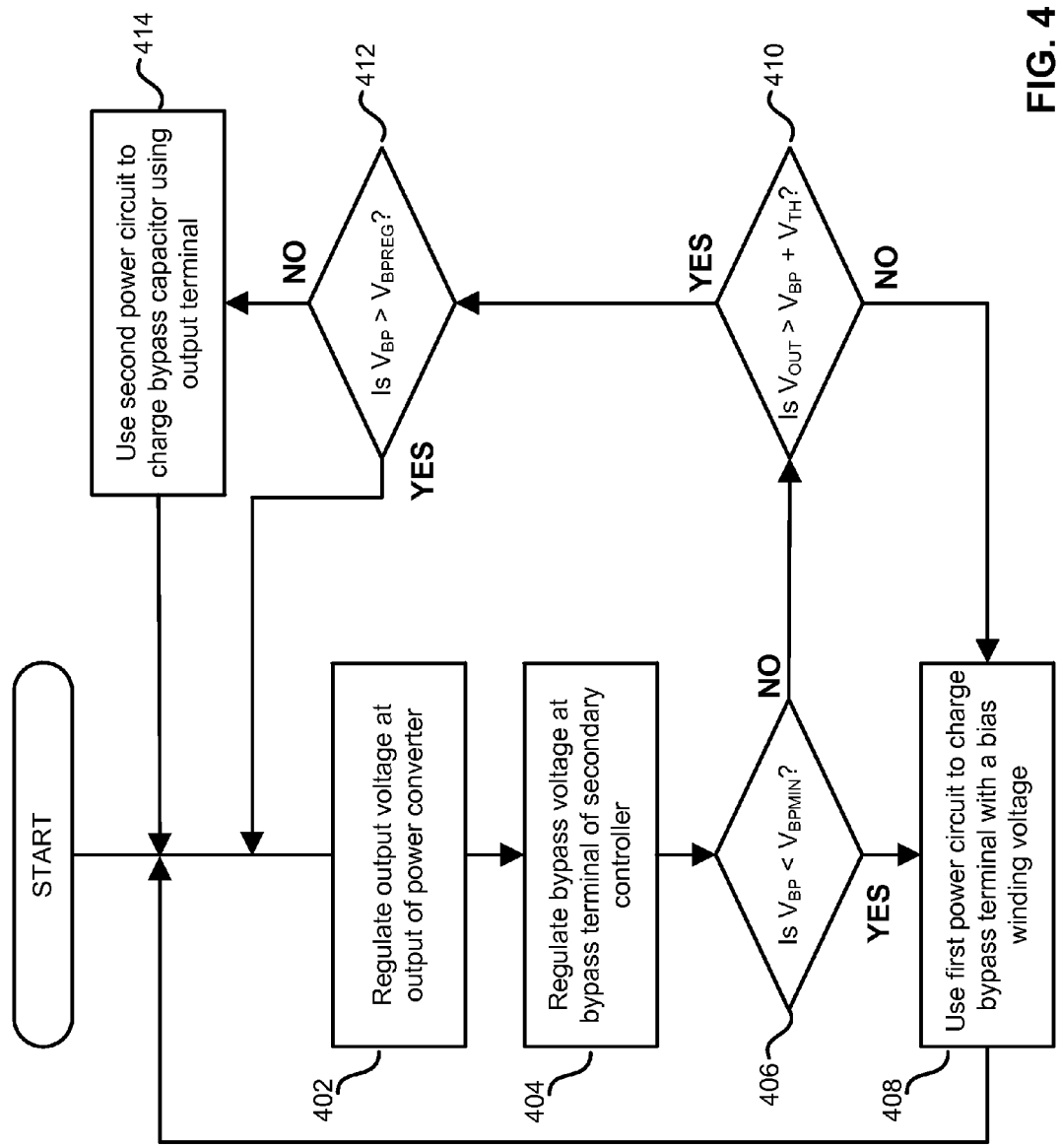
FIG. 4 is a flow diagram of an example method for controlling an isolated power converter during regulation according to the present disclosure.

An example isolated power converter according to the present disclosure is now described with reference to FIGS. 1-9. FIGS. 1-2 illustrate an example isolated power converter that includes a secondary controller that is coupled to switch between multiple charging sources. FIGS. 3A, 3B, and 4 show methods for operating a power converter of the present disclosure during startup and after the output voltage of the power converter has reached a desired regulated output voltage. FIGS. 5-8 show example circuits of the secondary controller in greater detail. FIG. 9 illustrates output voltage and bypass voltage along with control signals of the secondary controller during operation of an example power converter.

FIG. 1 is a schematic diagram of an example power converter 100 according to the present disclosure. Example power converter 100 is an isolated switch mode power converter having a flyback topology. Power converter 100 includes input terminals 102-1, 102-2 (collectively "input terminals 102") and output terminals 104-1, 104-2 (collectively "output terminals 104"). Input terminals 102 are coupled to receive an input voltage $V_{IN}$ 106, which may be a rectified and filtered ac voltage. For example, input terminals 102 may be coupled to a full-bridge rectifier (not shown) and a filter capacitance (not shown) that are coupled to rectify and filter an ac voltage received from an ac voltage source. In one example, input voltage $V_{IN}$ 106 may be a time-varying dc voltage. As shown, $V_{IN}$ 106 is referenced to input terminal 102-2, which may be referred to as "input return 102-2."

Output terminals 104 provide an output voltage $V_{OUT}$ 108 to an electrical load (not shown), such as a tablet computing device. After startup of power converter 100, power converter 100 may regulate the value of output voltage $V_{OUT}$ 108 to a desired regulated output voltage value (e.g., 5-12 V dc). Startup may be a period of time starting from when power converter 100 is introduced to $V_{IN}$ 106 until the control circuits of power converter 100 begin operating to regulate the output voltage $V_{OUT}$ 108 of power converter 100. Accordingly, output voltage $V_{OUT}$ 108 may be referred to as a "regulated output voltage." Output terminals 104 are coupled to an output capacitor 110 to smooth out regulated output voltage $V_{OUT}$ 108. As shown, output voltage $V_{OUT}$ 108 is referenced to output terminal 104-2, which may be referred to as "output return 104-2." In one example, output capacitor 110 may have a capacitance value in the range of approximately 200-600 µF.

As further shown, power converter 100 includes an energy transfer element 112, which includes a primary winding 114 and a secondary winding 116. Energy transfer element 112 is coupled to transfer electrical energy from primary winding 114 to secondary winding 116. In one example, energy transfer element 112 may be a coupled inductor. Circuits that are electrically coupled between input terminals 102 and primary winding 114 may be referred to as the "primary side" of power converter 100. Circuits that are electrically coupled between secondary winding 116 and output terminals 104 may be referred to as the "secondary side" of power converter 100. Energy transfer element 112 provides galvanic isolation between circuits on the primary side of power converter 100 and circuits on the secondary side of power converter 100. Accordingly, a dc voltage applied between the primary side and the secondary side of power converter 100 will produce substantially zero current.

Power converter 100 includes a primary side control circuit 118 (hereinafter "primary controller 118"), a secondary side control circuit 120 (hereinafter "secondary controller 120"), and a power switch 122. Primary controller 118, secondary controller 120, and power switch 122 are included in an integrated circuit package 124, which is illustrated as a box in FIG. 1.

In one example, integrated circuit package 124 may include a first integrated circuit die and a second integrated circuit die within an encapsulation. An encapsulation may refer to an encasing or molding that surrounds or encloses one or more integrated circuit dice and a portion of a lead frame. The first integrated circuit die may include primary controller 118 and power switch 122. The second integrated circuit die may include secondary controller 120. In another example, integrated circuit package 124 may include 3 integrated circuit dice within an encapsulation. For example, integrated circuit package 124 may include a first integrated circuit die that includes power switch 122, a second integrated circuit die that includes primary controller 118, and a third integrated circuit die that includes secondary controller 120. The dice including primary controller 118 and secondary controller 120 are galvanically isolated from one another. Accordingly, secondary controller 120 is galvanically isolated from primary controller 118 and power switch 122. Although primary controller 118, secondary controller 120, and power switch 122 are illustrated as included in a single integrated circuit package, in other examples, one or more of primary controller 118, secondary controller 120, and power switch 122 may be located outside of an integrated circuit package. For example, power switch 122 may be included in an integrated circuit package that is separate from another integrated circuit package that includes both primary controller 118 and secondary controller 120.

Although primary controller 118 and secondary controller 120 are galvanically isolated from one another, primary controller 118 and secondary controller 120 may communicate with one another. In one example, secondary controller 120 may communicate with primary controller 118 through a magnetically coupled communication link formed by isolated conductors of the lead frame of integrated circuit package 124. For example, the communication link between primary controller 118 and secondary controller 120 may be implemented using galvanically isolated conductive loops included in the lead frame of integrated circuit package 124. In another example, secondary controller 120 may communicate with primary controller 118 through an optically coupled communication link.

Circuits external to integrated circuit package 124 may electrically couple to package terminals D 126-1, S 126-2, PBP 126-3, FWD 126-4, SR 126-5, BP 126-6, GND 126-7, VOUT 126-8, and FB 126-9 (collectively "package terminals 126") of integrated circuit package 124. Package terminals 126 of integrated circuit package 124 may include conductive pins and/or conductive pads for connection to circuits external to integrated circuit package 124.

Package terminals 126 may connect to terminals (e.g., on integrated circuit die) of power switch 122, primary controller 118, and secondary controller 120 included on the inside of integrated circuit package 124. Power switch 122 includes terminals D 128-1 and S 128-2. Primary controller 118 includes terminal PBP 128-3. Secondary controller 120 includes terminals FWD 128-4, SR 128-5, BP 128-6, GND 128-7, VOUT 128-8, and FB 128-9. Terminals D 128-1, S 128-2, PBP 128-3, FWD 128-4, SR 128-5, BP 128-6, GND 128-7, VOUT 128-8, and FB 128-9 may be conductive connections included on the integrated circuit die that include power switch 122, primary controller 118, and secondary controller 120. GND terminal 128-7 is coupled to output terminal 104-2. In one example, GND terminal 128-7 may be the output return for secondary controller 120.

As shown, primary controller 118 is coupled to circuit components of the primary side of power converter 100, such as power switch 122. Secondary controller 120 is coupled to circuit components of the secondary side of power converter 100. For example, secondary controller 120 is coupled to secondary winding 116, output terminals 104, a bypass capacitor 130, a synchronous rectification circuit 132, along with other circuit components. Primary controller 118 and secondary controller 120 control circuits of power converter 100 (e.g., power switch 122 and synchronous rectification circuit 132) to control energy transfer from input terminals 102 to output terminals 104.

In operation, secondary controller 120 of the present disclosure receives power from the secondary side of power converter 100. For example, secondary controller 120 may receive power to operate from bypass capacitor 130 which is coupled to secondary controller 120 at BP terminal 128-6. Secondary controller 120 includes circuits that control charging of bypass capacitor 130 and regulation of bypass voltage $V_{BP}$ 134 across bypass capacitor 130. In one example, bypass capacitor 130 may have a capacitance value in the range of approximately 1-2 μF. Charging of bypass capacitor 130 and regulation of bypass voltage $V_{BP}$ 134 during startup and subsequent operation of power converter 100 are described in further detail hereinafter.

Although primary controller 118 and secondary controller 120 are galvanically isolated from one another, secondary controller 120 may transmit an enable signal 136 to primary controller 118. For example, secondary controller 120 may transmit enable signal 136 via galvanically isolated conductive loops included in the lead frame of integrated circuit package 124. Primary controller 118 may control the state of power switch 122 in response to enable signal 136 received from secondary controller 120.

Power switch 122 may be a high voltage power switch, which may have a breakdown voltage in the range of 700 V to 800 V. In one example, power switch 122 may be a power metal-oxide-semiconductor field-effect transistor (MOSFET), as illustrated in FIG. 2. As shown, power switch 122 is coupled to primary winding 114 and input return 102-2. In examples where power switch 122 is a power MOSFET, drain terminal D 128-1 of the power MOSFET may be coupled to primary winding 114 and source terminal S 128-2 of the power MOSFET may be coupled to input return 102-2, as illustrated in FIG. 2.

In operation, primary controller 118 controls current through power switch 122 and primary winding 114. In general, power switch 122 may be in an "ON" state (e.g., as a closed switch) or an "OFF" state (e.g., as an open switch), depending on a switch drive signal 138 generated by primary controller 118. When power switch 122 is in the ON state (e.g., a closed switch), power switch 122 may conduct current. When power switch 122 is in the OFF state (e.g., an open switch), power switch 122 may not conduct current when a voltage is applied across power switch 122.

When power switch 122 is in the ON state, current through primary winding 114 increases, storing energy in energy transfer element 112. Additionally, a primary winding voltage $V_P$ 140 with a first polarity develops across primary winding 114 while power switch 122 is in the ON state. A secondary winding voltage $V_S$ 142 of opposite polarity with respect to primary winding voltage $V_P$ 140 develops across secondary winding 116 while power switch 122 is in the ON state. As described herein, secondary controller 120 may transfer energy to bypass capacitor 130 when power switch 122 is in the ON state. Clamp circuit 144 is coupled to input winding 114 of energy transfer element 112 to limit the maximum voltage on power switch 122 when power switch 122 transitions between an ON state and an OFF state.

When power switch 122 is in the OFF state, power switch 122 may act as an open circuit and substantially prevents current through power switch 122. When power switch 122 transitions from the ON state to the OFF state, secondary winding voltage $V_S$ 142 allows for energy to be transferred to output capacitor 110, which provides power to an electrical load connected to output terminals 104. In one example, secondary controller 120 may control synchronous rectification circuit 132 to act as a closed switch when power switch 122 transitions form the ON state to the OFF state so that output capacitor 110 is efficiently charged. For example, the transistor of synchronous rectification circuit 132 may act as a closed switch having a low on-resistance during charging of output capacitor 110 so that the voltage drop across synchronous rectification circuit 132 is low. The low voltage drop across synchronous rectification circuit 132 during charging of output capacitor 110 may provide an increase in efficiency relative to other converter topologies that include a passive component (e.g., a diode) in place of synchronous rectification circuit 132. Although power converter 100 includes synchronous rectification circuit 132, in some examples, power converter 100 may include a passive rectification component, such as a diode, instead of synchronous rectification circuit 132.

As shown, primary controller 118 is coupled to power switch 122 to control the state of power switch 122. Primary controller 118 generates switch drive signal 138 that drives power switch 122 in response to enable signal 136. In an example where power switch 122 is a power MOSFET, primary controller 118 may be coupled to the gate of the power MOSFET, as illustrated in FIG. 2. In this example, primary controller 118 may apply a gate-to-source voltage that is greater than the threshold voltage of the power MOSFET to put the power MOSFET in the ON state. Primary controller 118 may apply a gate-to-source voltage that is less than the threshold voltage of the power MOSFET to put the power MOSFET in the OFF state.

In operation, primary controller 118 receives operating power from input terminals 102 and/or primary bypass capacitor 146. Primary bypass capacitor 146 may store energy received from input terminals 102 when input voltage $V_{IN}$ 106 is provided at input terminals 102. Energy stored on primary bypass capacitor 146 may be used as operating power by primary controller 118, e.g., to generate switch drive signal 138 in response to enable signal 136 received from secondary controller 120. In one example, primary bypass capacitor 146 may be charged when power switch 122 is in an OFF state.

Secondary controller 120 transmits enable signal 138 to primary controller 118 to indicate to primary controller 118 how to switch power switch 122. Specifically, primary controller 118 generates switch drive signal 138 that controls the state of power switch 122 in response to enable signal 136 received from secondary controller 120. Secondary controller 120 may generate enable signal 136 in response to a sensed output (e.g., current and/or voltage) of power converter 100. For example, secondary controller 120 of FIG. 1 senses feedback voltage $V_{FB}$ 148 at feedback terminal FB 128-9 (e.g., with respect to GND terminal 128-7) and generates enable signal 136 in response to feedback voltage $V_{FB}$ 148. In one example, feedback voltage $V_{FB}$ 148 sensed at FB terminal 128-9 is a scaled down voltage, scaled by resistor divider circuit 150, that is representative of output voltage $V_{OUT}$ 108 of power converter 100. Although example secondary controller 120 of FIG. 1 generates enable signal 136 in response to a sensed output voltage of power converter 100, it is contemplated that, in some examples, secondary controller 120 may generate an enable signal in response to other sensed parameters, such as the output current and/or a combination of output voltage $V_{OUT}$ 108 and output current $I_{OUT}$ 121 of power converter 100.

In operation, secondary controller 120 is coupled to transmit enable signal 136 to primary controller 118 to regulate output voltage $V_{OUT}$ 108 at a regulated output voltage value in response to a sensed feedback voltage $V_{FB}$ 148. If secondary controller 120 senses that output voltage $V_{OUT}$ 108 has dropped to a value that is less than a regulated output voltage value in response to feedback voltage $V_{FB}$ 148, secondary controller 120 may generate enable signal 136 that indicates to primary controller 118 that primary controller 118 should turn on power switch 122. In response to such an enable signal 136, primary controller 118 may turn on power switch 122 in order to increase output voltage $V_{OUT}$ 108 towards the regulated output voltage value. If output voltage $V_{OUT}$ 108 is greater than, or equal to, the desired regulated output voltage value, then secondary controller 120 may generate an enable signal 136 that indicates to primary controller 118 that primary controller should turn off power switch 122. In response to such an enable signal 136, primary contoller 118 may turn off power switch 122 to maintain output voltage $V_{OUT}$ 108.

In one example, secondary controller 120 controls operation of synchronous rectification circuit 132 using SR terminal 128-5 that is connected to the gate of the MOSFET switch of synchronous rectification circuit 132 via package terminal SR 126-5. In one example, secondary controller 120 controls synchronous rectification circuit 132 by generating a control voltage at SR terminal 128-5 that controls the MOSFET switch of synchronous rectification circuit 132. As described above, in some examples, synchronous rectification circuit 132 may be replaced by a passive rectification circuit. In these examples, SR terminal 128-5 may be removed from secondary controller 120.

Bypass capacitor 130 is coupled to bypass terminal BP 128-6 and ground terminal GND 128-7 of secondary controller 120. Bypass capacitor 130 is coupled to supply power to internal circuitry of secondary controller 120. For example, bypass capacitor 130 is coupled to BP terminal 128-6 to supply power to circuits of secondary controller 120 that control synchronous rectification circuit 132, generation of enable signal 136 in response to feedback voltage $V_{FB}$ 148, and other logic functions within secondary controller 120 described hereinafter. The voltage developed across bypass capacitor 130 is referred to herein as a bypass voltage $V_{BP}$ 134. Secondary controller 120 includes circuits that regulate bypass voltage $V_{BP}$ 134 in order to maintain bypass voltage $V_{BP}$ 134 at a bypass regulation voltage value $V_{BPREG}$. In some examples described herein, bypass regulation voltage value $V_{BPREG}$ may be approximately 4.4 V. Bypass regulation voltage value $V_{BPREG}$ may be set at a voltage value that is greater than a minimum value of bypass voltage $V_{BP}$ 134 that is sufficient to operate circuits of secondary controller 120. In some examples, the minimum value of bypass voltage $V_{BP}$ 134 that is sufficient to operate circuits of secondary controller 120 may be approximately 3.9 V.

Secondary controller 120 includes a first power circuit 152, second power circuit 154, bypass regulation circuit 156, charging control circuit 158, and secondary switching circuit 160. Secondary switching circuit 160 is coupled to provide a variety of functions for secondary controller 120. For example, secondary switching circuit 160 may control synchronous rectification circuit 132 and generation of enable signal 136 in response to feedback voltage $V_{FB}$ 148.

Secondary controller 120 is coupled to charge bypass capacitor 130 from at least one of forward terminal FWD 128-4 and output voltage terminal VOUT 128-8. In the example secondary controller 120 of FIG. 1, forward terminal FWD 128-4 is coupled to node 162, which is a node of secondary winding 116. In FIG. 1, output voltage terminal VOUT 128-8 is coupled to node 163, which is coupled to output terminal 104-1 of power converter 100, which supplies regulated output voltage $V_{OUT}$ 108. Accordingly, example secondary controller 120 of FIG. 1 is coupled to charge bypass capacitor 130 from at least one of nodes 162 and 163 of the secondary side of power converter 100. Although forward terminal FWD 128-4 and output voltage terminal VOUT 128-8 are coupled to nodes 162 and 163 in FIG. 1, it is contemplated that forward terminal FWD 128-4 and/or output voltage terminal VOUT 128-8 may be connected to other nodes of power converter 100. Accordingly, it is contemplated that, in some examples, secondary controller 120 may charge bypass capacitor 130 from nodes on the secondary side other than nodes 162 and 163 of power converter 100.

As described above, secondary controller 120 is coupled to charge bypass capacitor 130 from at least one of node 162 and node 163. Put another way, secondary controller 120 is coupled to transfer charge from at least one of forward terminal FWD 128-4 and output voltage terminal VOUT 128-8 to bypass terminal BP 128-6 for charging bypass capacitor 130. Secondary controller 120 includes circuits through which charge is transferred from at least one of forward terminal FWD 128-4 and output voltage terminal VOUT 128-8 to bypass capacitor 130. For example, first power circuit 152 and second power circuit 154 are circuits through which charge is transferred to bypass capacitor 130.

First power circuit 152 may transfer charge from forward terminal FWD 128-4 to bypass terminal BP 128-6 when first power circuit 152 is enabled, and second power circuit 154 may transfer charge from output voltage terminal VOUT 128-8 to bypass terminal BP 128-6 when second power circuit 154 is enabled. First power circuit 152 may disconnect forward terminal FWD 128-4 from bypass terminal BP 128-6 so that substantially no charge is transferred from forward terminal FWD 128-4 to bypass terminal BP 128-6 when first power circuit 152 is disabled. Similarly, second power circuit 154 may disconnect output voltage terminal VOUT 128-8 from bypass terminal BP 128-6 so that substantially no charge is transferred from output voltage terminal VOUT 128-8 to bypass terminal BP 128-6 when second power circuit 154 is disabled. Broken line 164 in FIG. 1 illustrates that first power circuit 152 is coupled to forward terminal FWD 128-4 and bypass terminal BP 128-6 for transferring charge from forward terminal FWD 128-4 to bypass terminal BP 128-6. Broken line 166 in FIG. 1 illustrates that second power circuit 154 is coupled to output voltage terminal VOUT 128-8 and bypass terminal BP 128-6 for transferring charge from output voltage terminal VOUT 128-8 to bypass terminal BP 128-6.

Secondary controller 120 also includes circuits that control which of forward terminal FWD 128-4 and output voltage terminal VOUT 128-8 are used to charge bypass capacitor 130. For example, secondary controller 120 includes a charging control circuit 158 that controls which of forward terminal FWD 128-4 and output voltage terminal VOUT 128-8 transfers charge to bypass terminal BP 128-6 for charging bypass capacitor 130. Charging control circuit 158 may control which of forward terminal FWD 128-4 and output voltage terminal VOUT 128-8 charge bypass capacitor 130 by enabling/disabling first and second power circuits 152 and 154.

In operation, charging control circuit 158 may control which of forward terminal FWD 128-4 and output voltage terminal VOUT 128-8 charge bypass capacitor 130 based on a variety of conditions. In one example, charging control circuit 158 may control which of forward terminal FWD 128-4 and output voltage terminal VOUT 128-8 charge bypass capacitor 130 in response to the magnitude of output voltage $V_{OUT}$ 108 relative to bypass voltage $V_{BP}$ 134. For example, charging control circuit 158 may select which of forward terminal FWD 128-4 and output voltage terminal VOUT 128-8 is to be used to charge bypass capacitor 130 based on the relative magnitudes of output voltage $V_{OUT}$ 108 and bypass voltage $V_{BP}$ 134. In one example, charging control circuit 158 may select output voltage terminal VOUT 128-8 (i.e., select second power circuit 154) to charge bypass capacitor 130 when output voltage $V_{OUT}$ 108 is greater than bypass voltage $V_{BP}$ 134 by a threshold voltage (referred to herein as "threshold voltage $V_{TH}$"). Otherwise, when output voltage $V_{OUT}$ 108 is within a threshold voltage $V_{TH}$ of bypass voltage $V_{BP}$ 134, or less than bypass voltage $V_{BP}$ 134, charging control circuit 158 may select forward terminal FWD 128-4 (i.e., select first power circuit 152) to charge bypass capacitor 130.

Secondary controller 120 may also include a bypass regulation circuit 156 that senses bypass voltage $V_{BP}$ 134 and indicates to charging control circuit 158 whether bypass voltage $V_{BP}$ 134 is greater than or less than bypass regulation voltage value $V_{BPREG}$. Charging control circuit 158 may control which of forward terminal FWD 128-4 and output voltage terminal VOUT 128-4 charge bypass capacitor 130 in response to whether bypass voltage $V_{BP}$ 134 is greater than or less than bypass regulation voltage value $V_{BPREG}$ by enabling/disabling the selected one of first and second power circuits 152 and 154. For example, charging control circuit 158 may enable the selected one of first and second power circuits 152 and 154 to charge bypass capacitor 130 so that bypass voltage $V_{BP}$ 134 is equal to or greater than bypass regulation voltage value $V_{BPREG}$ in response to determining that bypass voltage $V_{BP}$ 134 has dropped to a value below bypass regulation voltage value $V_{BPREG}$. Charging control circuit 158 may disable the selected one of first and second power circuits 152 and 154 when bypass voltage $V_{BP}$ 134 is greater than, or equal to, bypass regulation voltage value $V_{BPREG}$ so that bypass voltage $V_{BP}$ 134 is not charged to a voltage greater than bypass regulation voltage value $V_{BPREG}$.

Operation of circuits included in secondary controller 120 is now described in greater detail with respect to FIG. 2. FIG. 2 shows an example integrated circuit package 224 that includes a power switch 222 (e.g., power MOSFET 222), an example primary controller 218, and an example secondary controller 220. Circuits external to integrated circuit package 224 may electrically couple to package terminals D 226-1, S 226-2, PBP 226-3, FWD 226-4, SR 226-5, BP 226-6, GND 226-7, VOUT 226-8, and FB 226-9 (collectively "package terminals 226") of integrated circuit package 224.

Package terminals 226 may connect to terminals (e.g., on integrated circuit dice) of power switch 222, primary controller 218, and secondary controller 220 included on the inside of integrated circuit package 224. Power switch 222 includes drain terminal D 228-1 and source terminal S 228-2. Primary controller 218 includes primary bypass terminal PBP 228-3. Secondary controller 220 includes forward terminal FWD 228-4, synchronous rectifier terminal SR 228-5, bypass terminal BP 228-6, ground terminal GND 228-7, output voltage terminal VOUT 228-8, and feedback terminal FB 228-9. Drain terminal D 228-1, source terminal S 228-2, primary bypass terminal PBP 228-3, forward terminal FWD 228-4, synchronous rectifier terminal SR 228-5, bypass terminal BP 228-6, ground terminal GND 228-7, output voltage terminal VOUT 228-8, and feedback terminal FB 228-9 may be conductive connections included on the integrated circuit dice that include power switch 222, primary controller 218, and secondary controller 220. Package terminals 226 may be connected to a power converter in a similar manner as illustrated in FIG. 1. Accordingly, the description of integrated circuit package 224 may hereinafter reference the components of power converter 100 of FIG. 1.

Secondary controller 220 includes a first power circuit 252, second power circuit 254, bypass regulation circuit 256, charging control circuit 258, and secondary switching circuit 260. Secondary switching circuit 260 is coupled to provide a variety of functions of secondary controller 220. For example, secondary switching circuit 260 may generate a control signal USR 268 that controls synchronous rectification circuit 132, which may be coupled to synchronous rectifier terminal SR 228-5.

Secondary switching circuit 260 is coupled to transmit enable signal $U_{EN}$ 236 to primary controller 218 to regulate output voltage $V_{OUT}$ 108 at a regulated output voltage value in response to a sensed feedback signal $U_{FB}$ 270. Secondary switching circuit 260 may receive feedback signal $U_{FB}$ 270 that is representative of an output parameter (e.g., voltage and/or current) of a power converter 100. In one example, feedback signal $U_{FB}$ 270 is a feedback voltage sensed by secondary switching circuit 260. Secondary switching circuit 260 may generate enable signal $U_{EN}$ 236 in response to feedback signal $U_{FB}$ 270. Primary controller 218 is coupled to receive enable signal $U_{EN}$ 236 and control power switch 222 in response to enable signal $U_{EN}$ 236 to regulate output voltage $V_{OUT}$ 108. Secondary switching circuit 260 may transmit enable signal $U_{EN}$ 236 to primary controller 218 via magnetic coupling provided by a magnetically coupled communication link formed by isolated conductors of the lead frame of integrated circuit package 224.

First power circuit 252 is coupled to forward terminal FWD 228-4 and bypass terminal BP 228-6 to transfer charge from forward terminal FWD 228-4 to bypass terminal BP 228-6. Second power circuit 254 is coupled to output voltage terminal VOUT 228-8 and bypass terminal BP 228-6 to transfer charge from output voltage terminal VOUT 228-8 to bypass terminal BP 228-6. First power circuit 252 may be in an enabled state or a disabled state. Similarly, second power circuit 254 may be in an enabled state or a disabled state. Charging control circuit 258 is coupled to first power circuit 252 and second power circuit 254 to control the states of first power circuit 252 and second power circuit 254.

With respect to FIG. 2, charging control circuit 258 is coupled to generate a control signal $U_{S1}$ 272 to enable/disable first power circuit 252. Charging control circuit 258 is coupled to generate control signals $U_{S2}$ 274 and $U_{VOUTCOMP}$ 276 to enable/disable second power circuit 254. Details regarding generation of control signals $U_{S1}$ 272, $U_{S2}$ 274, and $U_{VOUTCOMP}$ 276 by charging control circuit 258, and the responses of first power circuit 252 and second power circuit 254 to control signals $U_{S1}$ 272, $U_{S2}$ 274, and $U_{VOUTCOMP}$ 276 are described hereinafter in greater detail.

When first power circuit 252 is in an enabled state, first power circuit 252 may transfer charge from forward terminal FWD 228-4 to bypass terminal BP 228-6 to charge bypass capacitor 130. When first power circuit 252 is in a disabled state, first power circuit 252 may disconnect forward terminal FWD 228-4 from bypass terminal BP 228-6 such that charge is not transferred from forward terminal FWD 228-4 to bypass capacitor 130. When second power circuit 254 is in an enabled state, second power circuit 254 may transfer charge from output voltage terminal VOUT 228-8 to bypass terminal BP 228-6 to charge bypass capacitor 130. When second power circuit 254 is in a disabled state, second power circuit 254 may disconnect output voltage terminal VOUT 228-8 from bypass terminal BP 228-6 so that charge is not transferred from output voltage terminal VOUT 228-8 to BP terminal 228-6.

In one example, charging control circuit 258 may enable first power circuit 252 while disabling second power circuit 254 so that bypass capacitor 130 is charged by forward terminal FWD 228-4. In another example, charging control circuit 258 may enable second power circuit 254 while disabling first power circuit 252 so that bypass capacitor 130 is charged by output voltage terminal VOUT 228-8. In another example, charging control circuit 258 may disable both first power circuit 252 and second power circuit 254 so that charge transfer from both forward terminal FWD 228-4 and output voltage terminal VOUT 228-8 to bypass capacitor 130 is inhibited by first and second power circuits 252, 254. In another example, charging control circuit 258 may enable both first power circuit 252 and second power circuit 254 so that bypass capacitor 130 is charged by forward terminal FWD 228-4 and output voltage terminal VOUT 228-8.

Secondary controller 220 includes a bypass regulation circuit 256 that senses $V_{BP}$ 134 at bypass terminal BP 228-6 and generates control signal $U_{BPREG}$ 278 in response to the value of bypass voltage $V_{BP}$ 134. Control signal $U_{BPREG}$ 278 is a signal that indicates whether bypass voltage $V_{BP}$ 134 is being maintained at the bypass regulation voltage value $V_{BPREG}$. For example, control signal $U_{BPREG}$ 278 may be a digital control signal that indicates whether bypass voltage $V_{BP}$ 134 is greater than or less than bypass regulation voltage value $V_{BPREG}$. As described hereinafter, charging control circuit 258 may control the charging of bypass capacitor 130 in response to the control signal $U_{BPREG}$ 278 that indicates whether bypass voltage $V_{BP}$ 134 is greater than or less than bypass regulation voltage value $V_{BPREG}$.

Charging control circuit 258 controls which of first and second power circuits 252, 254 transfer charge to bypass capacitor 130 in response to a variety of conditions described herein. In general, charging control circuit 258 controls the state of first and second power circuits 252, 254 in response to bypass voltage $V_{BP}$ 134 and output voltage $V_{OUT}$ 108. Charging control circuit 258 may select which of first and second power circuits 252, 254 to enable and disable based on the magnitude of output voltage $V_{OUT}$ 108 relative to the magnitude of bypass voltage $V_{BP}$ 134. Charging control circuit 258 may determine whether to enable the selected power circuit(s) based on whether bypass voltage $V_{BP}$ 134 is less than bypass regulation voltage value $V_{BPREG}$, as indicated by $U_{BPREG}$ 278. Selection of first and second power circuits 252, 254 by charging control circuit 258 and the control of the states of first and second power circuits 252, 254 by charging control circuit 258 are described in greater detail hereinafter.

Charging control circuit 258 may select which of first and second power circuits 252, 254 transfer charge to bypass capacitor 130 in response to the magnitude of output voltage $V_{OUT}$ 108 relative to the magnitude of bypass voltage $V_{BP}$ 134. For example, charging control circuit 258 may select second power circuit 254 to charge bypass capacitor 130 when output voltage $V_{OUT}$ 108 is greater than bypass voltage $V_{BP}$ 134 (e.g., by a threshold amount of voltage $V_{TH}$) since output voltage $V_{OUT}$ 108 may be at a sufficient magnitude to charge bypass capacitor 130. As another example, charging control circuit 258 may select first power circuit 252 to charge bypass capacitor 130 when output voltage $V_{OUT}$ 108 drops to a value that may be insufficient for charging bypass capacitor 130.

Charging control circuit 258 may enable the selected power circuit in response to a $U_{BPREG}$ signal that indicates bypass voltage $V_{BP}$ 134 has dropped below bypass regulation voltage value $V_{BPREG}$. Enabling the selected power circuit may cause bypass voltage $V_{BP}$ 134 to increase in value towards bypass regulation voltage value $V_{BPREG}$. Alternatively, charging control circuit 258 may disable first and second power circuits 252, 254 in response to a $U_{BPREG}$ signal that indicates that bypass voltage $V_{BP}$ 134 is greater than or equal to bypass regulation voltage value $V_{BPREG}$ so that bypass voltage $V_{BP}$ 134 is not charged to a value that substantially exceeds bypass regulation voltage value $V_{BPREG}$.

As shown, bypass voltage terminal BP 228-6 is coupled to connect to bypass capacitor 130 that is external to secondary controller 220. Bypass capacitor 130 supplies power to circuits of secondary controller 220. For example, bypass capacitor 130 is coupled to bypass terminal BP 228-6 to supply power to charging control circuit 258, bypass regulation circuit 256, and secondary switching circuit 260.

During startup of power converter 100, e.g., when input voltage $V_{IN}$ 106 is introduced to input terminals 102, bypass voltage $V_{BP}$ 134 may be a relatively low voltage value (e.g., approximately zero volts) because bypass capacitor 130 may initially be uncharged, or only slightly charged. Accordingly, at startup, bypass capacitor 130 may not supply sufficient power to operate circuits of secondary controller 220, such as charging control circuit 258, bypass regulation circuit 256, and secondary switching circuit 260. Operation of power switch 222, primary controller 218, and secondary controller 220 during startup is described in detail hereinafter.

At startup, primary controller 218, which receives power from input voltage $V_{IN}$ 106, starts switching the state of power switch 222 between the OFF state and the ON state. Switching of power switch 222 starts the transfer of energy to the secondary side of power converter 100. Since bypass voltage $V_{BP}$ 134 may be initially insufficient to operate secondary switching circuit 260 at startup, secondary switching circuit 260 may not receive sufficient power to transmit enable signal $U_{EN}$ 236 to primary controller 218. Accordingly, at startup, primary controller 218 may initially switch power switch 222 without receiving enable signal $U_{EN}$ 236 from secondary controller 220.

During startup, first power circuit 252 may transfer charge to bypass capacitor 130 via bypass terminal BP 228-6 while power switch 222 is in the ON state. In this manner, primary controller 218 may control power switch 222 to switch states during startup to charge bypass capacitor 130 via first power circuit 252. During startup, output capacitor 110 may also be charged while primary controller 218 is controlling power switch 222 to switch states.

Second power circuit 254 may be disabled at startup if output voltage $V_{OUT}$ 108 is a relatively low voltage (e.g., less than the sum of bypass voltage $V_{BP}$ 134 and threshold voltage $V_{TH}$). Although second power circuit 254 may be disabled at startup if output voltage $V_{OUT}$ 108 is relatively low, bypass capacitor 130 may still be charged by first power circuit 252 from forward terminal FWD 228-4 while output voltage $V_{OUT}$ 108 continues to charge towards the desired regulated output voltage value that is sufficient to charge bypass capacitor 130 (e.g., a voltage greater than the sum of bypass voltage $V_{BP}$ 134 and threshold voltage $V_{TH}$).

Circuits of secondary controller 220 that are powered by bypass capacitor 130 may be configured to begin operation after startup when bypass voltage $V_{BP}$ 134 initially reaches bypass regulation voltage value $V_{BPREG}$. For example, charging control circuit 258, bypass regulation circuit 256, and secondary switching circuit 260 may begin operating when bypass voltage $V_{BP}$ 134 initially reaches bypass regulation voltage value $V_{BPREG}$ after startup. After circuits of secondary controller 220 begin operation after startup, bypass voltage $V_{BP}$ 134 may be regulated by circuits of secondary controller 220 at the bypass regulation voltage value $V_{BPREG}$, as described herein. After startup, the circuits of secondary controller 220 may continue to operate as described herein, unless a circumstance arises where bypass voltage $V_{BP}$ 134 drops below a minimum operating voltage (e.g., 3.9 V) of the circuits (e.g., logic circuits) of secondary controller 220.

In operation, bypass regulation circuit 256 is coupled to monitor bypass voltage $V_{BP}$ 134 and indicate to charging control circuit 258 when bypass voltage $V_{BP}$ 134 reaches a value of bypass regulation voltage value $V_{BPREG}$. In response to bypass voltage $V_{BP}$ 134 reaching or exceeding bypass regulation voltage value $V_{BPREG}$ during startup, bypass regulation circuit 256 may generate a control signal $U_{BPREG}$ 278 that indicates to charging control circuit 258 that bypass voltage $V_{BP}$ 134 has reached bypass regulation voltage value $V_{BPREG}$. In response to the control signal $U_{BPREG}$ 278 indicating that bypass voltage $V_{BP}$ 134 has reached bypass regulation voltage value $V_{BPREG}$, charging control circuit 258 disables charging of bypass capacitor 130. In the example described above, if first power circuit 252 was enabled during startup, charging control circuit 258 would disable first power circuit 252 using control signal $U_{S1}$ 272. First power circuit 252 may disconnect forward terminal FWD 228-4 from BP terminal 228-6 in response to disabling control signal $U_{S1}$ 272. With both first power circuit 252 and second power circuit 254 disabled, as described above, bypass voltage $V_{BP}$ 134 may be maintained at approximately bypass regulation voltage value $V_{BPREG}$ for a period of time.

If bypass voltage $V_{BP}$ 134 drops back below bypass regulation voltage value $V_{BPREG}$ while bypass capacitor 130 is providing power to circuits of secondary controller 220, bypass regulation circuit 256 may generate a signal that indicates that bypass voltage $V_{BP}$ 134 has dropped below bypass regulation voltage value $V_{BPREG}$. For example, in response to sensing that bypass voltage $V_{BP}$ 134 has dropped to a voltage less than bypass regulation voltage value $V_{BPREG}$, control signal $U_{BPREG}$ 278 indicates to charging control circuit 258 that bypass voltage $V_{BP}$ 134 is less than bypass regulation voltage value $V_{BPREG}$. In circumstances where output voltage $V_{OUT}$ 108 is insufficient to charge bypass capacitor 130 (e.g., output voltage $V_{OUT}$ 108 is less than the sum of bypass voltage $V_{BP}$ 134 and threshold voltage $V_{TH}$), charging control circuit 258 may enable first power circuit 252 in response to a control signal $U_{BPREG}$ 278 that indicates bypass voltage $V_{BP}$ 134 is less than bypass regulation voltage value $V_{BPREG}$. For example, charging control circuit 258 may generate a control signal $U_{S1}$ 272 that enables first power circuit 252. First power circuit 252 may then transition to an enabled state in response to the control signal $U_{S1}$ 272. While operating in the enabled state, first power circuit 252 may transfer charge from forward terminal FWD 228-4 to BP terminal 228-6 to charge bypass capacitor 130 so that bypass voltage $V_{BP}$ 134 is restored to bypass regulation voltage value $V_{BPREG}$.

In examples where output voltage $V_{OUT}$ 108 is insufficient to charge bypass capacitor 130, charging control circuit 258 may continue to enable and disable first power circuit 252 to regulate bypass voltage $V_{BP}$ 134 at a bypass regulation voltage value $V_{BPREG}$, as described above, until output voltage $V_{OUT}$ 108 has reached a value that is sufficient to charge bypass capacitor 130. After a period of time during which charging control circuit 258 has continued to enable and disable first power circuit 252, output voltage $V_{OUT}$ 108 increases to a voltage value that is greater than bypass voltage $V_{BP}$ 134. Output voltage $V_{OUT}$ 108 may then be used to charge bypass capacitor 130 when output voltage $V_{OUT}$ 108 is greater than bypass voltage $V_{BP}$ 134 (e.g., by a threshold voltage $V_{TH}$).

Charging control circuit 258 is coupled to determine when output voltage $V_{OUT}$ 108 is at a sufficient voltage to charge bypass capacitor 130. For example, charging control circuit 258 may determine that output voltage $V_{OUT}$ 108 is at a sufficient voltage to charge bypass capacitor 130 when output voltage $V_{OUT}$ 108 has a value that is a threshold voltage $V_{TH}$ greater than bypass voltage $V_{BP}$ 134. The threshold voltage $V_{TH}$ may be an amount of voltage that may be dropped across second power circuit 254 between output voltage terminal VOUT 228-8 and bypass terminal BP 228-6 while charging bypass capacitor 130 using second power circuit 254. In some examples described herein, the threshold voltage $V_{TH}$ may be approximately 0.4 V. Accordingly, in circumstances when charging control circuit 258 is regulating bypass voltage $V_{BP}$ 134 to bypass regulation voltage value $V_{BPREG}$ (e.g., 4.4 V) using first power circuit 252, output voltage terminal VOUT 228-8 may become able to sufficiently charge bypass capacitor 130 when output voltage $V_{OUT}$ 108 has reached bypass regulation voltage value $V_{BPREG}$ plus the threshold voltage $V_{TH}$ (e.g., 4.8 V or greater).

Upon determining that output voltage $V_{OUT}$ 108 has reached a sufficient value to charge bypass capacitor 130, charging control circuit 258 may select second power circuit 254 for charging bypass capacitor 130. In other words, charging control circuit 258 may control the state of second power circuit 254 to regulate bypass voltage $V_{BP}$ 134. For example, to regulate bypass voltage $V_{BP}$ 134 to bypass regulation voltage value $V_{BPREG}$, charging control circuit 258 may enable second power circuit 254 to charge bypass capacitor 130 when signal $U_{BPREG}$ 278 indicates that bypass voltage $V_{BP}$ 134 is less than bypass regulation voltage value $V_{BPREG}$. Additionally, charging control circuit 258 may disable second power circuit 254 to inhibit charging of bypass capacitor 130 when signal $U_{BPREG}$ 278 indicates that bypass voltage $V_{BP}$ 134 is greater than bypass regulation voltage value $V_{BPREG}$.

Upon selecting second power circuit 254 for charging bypass capacitor 130, charging control circuit 258 may disable first power circuit 252 so that first power circuit 252 does not charge bypass capacitor 130 from forward terminal FWD 228-4, even when bypass voltage $V_{BP}$ 134 drops below bypass regulation voltage value $V_{BPREG}$. Charging bypass capacitor 130 using output voltage $V_{OUT}$ terminal 228-8 may be more efficient than charging bypass capacitor 130 using forward terminal FWD 228-4 because output voltage $V_{OUT}$ 108 may generally be a lower voltage value than voltage developed at node 162 at secondary winding 116. For example, output voltage $V_{OUT}$ 108 may be in the range of 5-12 V, while voltage developed at secondary winding 116 may reach 15-50 V.

The timing of disabling and enabling first and second power circuits 252, 254 by charging control circuit 258 may vary, depending on how the circuits of secondary controller 220 are implemented. In one example, charging control circuit 258 may enable second power circuit 254 before disabling first power circuit 252 such that both first power circuit 252 and second power circuit 254 are used to charge bypass capacitor 130 at the same time. In another example, charging control circuit 258 may enable second power circuit 254 after disabling first power circuit 252 such that both first power circuit 252 and second power circuit 254 are used independently to charge bypass capacitor 130. The amount of time between disabling of first power circuit 252 and enabling of second power circuit 254 may vary, depending on how the circuits of secondary controller 220 are implemented.

After startup, when output voltage $V_{OUT}$ 108 is being regulated, output voltage $V_{OUT}$ 108 may typically be maintained at a value that is greater than bypass voltage $V_{BP}$ 134 (e.g., at least at a value of bypass voltage $V_{BP}$ 134 plus the threshold voltage $V_{TH}$). Accordingly, during typical operation, output voltage $V_{OUT}$ 108 may be maintained at a sufficient voltage for charging bypass capacitor 130. If output voltage $V_{OUT}$ 108 is maintained at a value that is greater than bypass voltage $V_{BP}$ 134 plus threshold voltage $V_{TH}$ during operation of power converter 100, charging control circuit 258 may maintain first power circuit 252 in the disabled state and control second power circuit 254 to regulate bypass voltage $V_{BP}$ 134 at bypass terminal 226-6 by charging bypass capacitor 130 from output voltage terminal VOUT 228-8.

In some circumstances, however, output voltage $V_{OUT}$ 108 may decrease in value to a voltage that is insufficient for charging bypass capacitor 130. For example, output voltage $V_{OUT}$ 108 may drop to a value that is within the threshold value of bypass voltage $V_{BP}$ 134, or less than bypass voltage $V_{BP}$ 134. In one example, output voltage $V_{OUT}$ 108 may drop to such a value due to an increased power draw by an electrical load connected to output terminals 104.

In circumstances where output voltage $V_{OUT}$ 108 decreases to a voltage value that is insufficient to charge bypass capacitor 130 (e.g., within a threshold voltage $V_{TH}$ of bypass voltage $V_{BP}$ 134), charging control circuit 258 may disable second power circuit 254 and enable first power circuit 252 to charge up bypass terminal BP 228-6 to the bypass regulation voltage value $V_{BPREG}$ using forward terminal FWD 228-4 as described above. The higher voltage developed at forward terminal FWD 228-4 relative to that of the recently decreased output voltage $V_{OUT}$ 108 may charge bypass capacitor 130 while the output voltage $V_{OUT}$ 108 increases back to the desired regulated output voltage.

After a period of time during which second power circuit 254 is disabled and charging control circuit 258 controls first power circuit 252 to maintain charge on bypass capacitor 130, output voltage $V_{OUT}$ 108 may increase back to a value that is greater than bypass voltage $V_{BP}$ 134. After output voltage $V_{OUT}$ 108 increases to a voltage value that is greater than bypass voltage $V_{BP}$ 134 plus the threshold voltage $V_{TH}$, charging control circuit 258 may control (e.g., enable/disable) second power circuit 254 to charge bypass capacitor 130 from output voltage terminal $V_{OUT}$ 228-8. Charging control circuit 258 may also disable first power circuit 252 to discontinue charging bypass capacitor 130 from forward terminal FWD 228-4.

Charging control circuit 258 and bypass regulation circuit 256 may continue monitoring bypass voltage $V_{BP}$ 134 and output voltage $V_{OUT}$ 108 during operation of power converter 100. Generally, after output voltage $V_{OUT}$ 108 has reached a desired regulated output value, output voltage $V_{OUT}$ 108 may tend to stay at a value that is greater than bypass voltage $V_{BP}$ 134 by at least the threshold value $V_{TH}$. Accordingly, during operation of power converter 100, first power circuit 252 may tend to be maintained in the disabled state while second power circuit 254 is transitioned back and forth between the enabled state and the disabled state by charging control circuit 258, depending on when bypass voltage $V_{BP}$ 134 drops below bypass voltage regulation value $V_{BPREG}$. Although first power circuit 252 may be disabled during typical operation of power converter 100, e.g., after output voltage $V_{OUT}$ 108 has reached the desired regulated output voltage, charging control circuit 258 may enable first power circuit 252 during circumstances in which output voltage $V_{OUT}$ 108 drops to a level that is insufficient to charge bypass capacitor 130.

In some examples, charging control circuit 258 may include circuits that enable second power circuit 254 when bypass voltage $V_{BP}$ 134 drops to a value that is near the minimum value of bypass voltage $V_{BP}$ 134 that is sufficient to operate circuits of secondary controller 220 (e.g., 3.9 V). The voltage value near the minimum bypass voltage $V_{BP}$ 134 may be referred to herein as a minimum bypass voltage value $V_{BPMIN}$. The minimum bypass voltage value $V_{BPMIN}$ may be a voltage value that is slightly greater than a minimum value of bypass voltage $V_{BP}$ 134 that is sufficient to operate circuits (e.g., logic gates) of secondary controller 220. For example, the minimum bypass voltage value $V_{BPMIN}$ may be selected to be approximately 4.1 V when the minimum value of bypass voltage $V_{BP}$ 134 that is sufficient to operate circuits of secondary controller 220 is approximately 3.9 V. Accordingly, if bypass voltage $V_{BP}$ 134 drops below minimum bypass voltage value $V_{BPMIN}$ (e.g., 4.1 V), secondary controller 220 may transition to charging bypass capacitor 130 using first power circuit 252. Operation of an example charging control circuit 258 is described hereinafter in greater detail (e.g., with respect to FIG. 5). In one sense, the circuits of charging control circuit 258 that enable first power circuit 252 to charge bypass capacitor 130 when bypass voltage $V_{BP}$ 134 is less than minimum bypass voltage value $V_{BPMIN}$ may be viewed as circuits that providing assurance that bypass voltage $V_{BP}$ 134 does not drop below a minimum operating voltage of the circuits of secondary controller 220.

FIGS. 3A-3B show an example method 300 for controlling an isolated power converter during startup according to the present disclosure. During startup, it may be assumed that bypass voltage $V_{BP}$ 134 may be a relatively low voltage value (e.g., approximately zero volts) because bypass capacitor 130 may initially be uncharged, or only slightly charged. Accordingly, at startup, bypass capacitor 130 may not supply sufficient power to operate circuits of secondary controller 220, such as charging control circuit 258, bypass regulation circuit 256, and secondary switching circuit 260.

After starting in block 302, power converter 100 is coupled to an ac source in block 304 such that input voltage $V_{IN}$ 106 is provided to input terminals 102. In block 306, primary controller 218 receives power from input voltage $V_{IN}$ 106. In block 308, primary controller 218 starts switching the state of power switch 222 between the OFF state and the ON state to begin transferring energy to the secondary side of power converter 100. In block 310, output capacitor 110 begins charging while primary controller 218 is switching the state of power switch 222. In block 312, secondary controller 220 charges bypass capacitor 130 from node 162 of secondary winding 116 while primary controller 218 is switching the state of power switch 222.

In block 314, bypass capacitor 130 is charged to bypass regulation voltage value $V_{BPREG}$. Circuits of secondary controller 220 may be configured to begin initially operating during startup when bypass voltage $V_{BP}$ 134 has reached bypass regulation voltage value $V_{BPREG}$. In block 316, secondary controller 220 determines whether output voltage $V_{OUT}$ 108 is greater than bypass voltage $V_{BP}$ 134 by a threshold voltage $V_{TH}$. If output voltage $V_{OUT}$ 108 is not greater than bypass voltage $V_{BP}$ 134 by the threshold voltage $V_{TH}$, secondary controller 220 continues charging bypass capacitor 130 from node 162 on secondary winding 116. If output voltage $V_{OUT}$ 108 is greater than bypass voltage $V_{BP}$ 134 by the threshold voltage $V_{TH}$, secondary controller 220 transitions from charging bypass capacitor 130 from node 162 on secondary winding 116 to charging bypass capacitor 130 from output terminal 104-1 in block 318. Method 300 ends in block 320.

FIG. 4 shows an example method 400 for controlling an isolated power converter after an output voltage of the isolated power converter has reached a desired regulated output voltage according to the present disclosure. Before the start of method 400, it may be assumed that secondary controller 220 has charged bypass capacitor 130 to bypass regulation voltage value $V_{BPREG}$ and that output voltage $V_{OUT}$ 108 has reached a value that is greater than bypass voltage $V_{BP}$ 134 by the threshold voltage $V_{TH}$ so that secondary controller 220 is charging bypass capacitor 130 using output terminal 104-1.

In block 402, power converter 100 is regulating output voltage $V_{OUT}$ 108 at the desired regulated output voltage. In block 404, secondary controller 220 is regulating bypass voltage $V_{BP}$ 134 at bypass regulation voltage value $V_{BPREG}$ by charging bypass capacitor 130 from output terminal 104-1 (i.e., output voltage $V_{OUT}$ 108).

If bypass voltage $V_{BP}$ 134 drops below minimum bypass voltage value $V_{BPMIN}$ in block 406, secondary controller 220 transitions to charging bypass capacitor 130 using node 162 on secondary winding 116 in block 408. If bypass voltage $V_{BP}$ 134 is maintained at a value that is greater than minimum bypass voltage value $V_{BPMIN}$ in block 406, method 400 continues in block 410. If output voltage $V_{OUT}$ 108 drops to a voltage value within a threshold voltage $V_{TH}$ of bypass voltage $V_{BP}$ 134 in block 410, secondary controller 220 transitions to charging bypass capacitor 130 using node 162 on secondary winding 116 in block 408.

If output voltage $V_{OUT}$ 108 is greater than bypass voltage $V_{BP}$ 134 by threshold voltage $V_{TH}$ in block 410 and bypass voltage $V_{BP}$ 134 is greater than bypass regulation voltage value $V_{BPREG}$ in block 412, then secondary controller 220 disables charging of bypass capacitor 130, e.g., by disabling second power circuit 254, and method 400 continues in block 402. If output voltage $V_{OUT}$ 108 is greater than bypass voltage $V_{BP}$ 134 by threshold voltage $V_{TH}$ in block 410 and bypass voltage $V_{BP}$ 134 is less than bypass regulation voltage value $V_{BPREG}$ in block 412, then secondary controller 220 controls charging of bypass capacitor 130 by enabling second power circuit 254.

FIGS. 5-8 show detailed examples of charging control circuit 258, first power circuit 252, and second power circuit 254. FIG. 9 shows example output voltage $V_{OUT}$ 108 and bypass voltage $V_{BP}$ 134 waveforms along with timing diagrams for control signals $U_{VOUTCOMP}$, $U_{VBCOMP}$, $U_{BPREG}$, $U_{S1}$, and $U_{S2}$. The waveforms and timing diagrams of FIG. 9 graphically illustrate operation of the circuits illustrated in FIG. 5. FIGS. 5-9 are described in detail hereinafter.

As described above, bypass regulation circuit 256 receives bypass voltage $V_{BP}$ 134 and outputs a digital control signal $U_{BPREG}$ 278. In general, bypass regulation circuit 256 generates control signal $U_{BPREG}$ 278 that indicates the magnitude of bypass voltage $V_{BP}$ 134 relative to the bypass regulation voltage value $V_{BPREG}$. If bypass voltage $V_{BP}$ 134 is less than bypass regulation voltage value $V_{BPREG}$, bypass regulation circuit 256 outputs a high $U_{BPREG}$ signal, which may indicate to charging control circuit 258 that charging control circuit 258 should enable one of first and second power circuits 252, 254 to charge bypass capacitor 130 to increase bypass voltage $V_{BP}$ 134 towards bypass regulation voltage value $V_{BPREG}$. If bypass voltage $V_{BP}$ 134 is greater than or equal to bypass regulation voltage value $V_{BPREG}$, bypass regulation circuit 256 outputs a low $U_{BPREG}$ signal, which may indicate to charging control circuit 258 that charging control circuit 258 should disable charging because bypass voltage $V_{BP}$ 134 has reached or exceeded bypass regulation voltage value $V_{BPREG}$.

Figure 5:
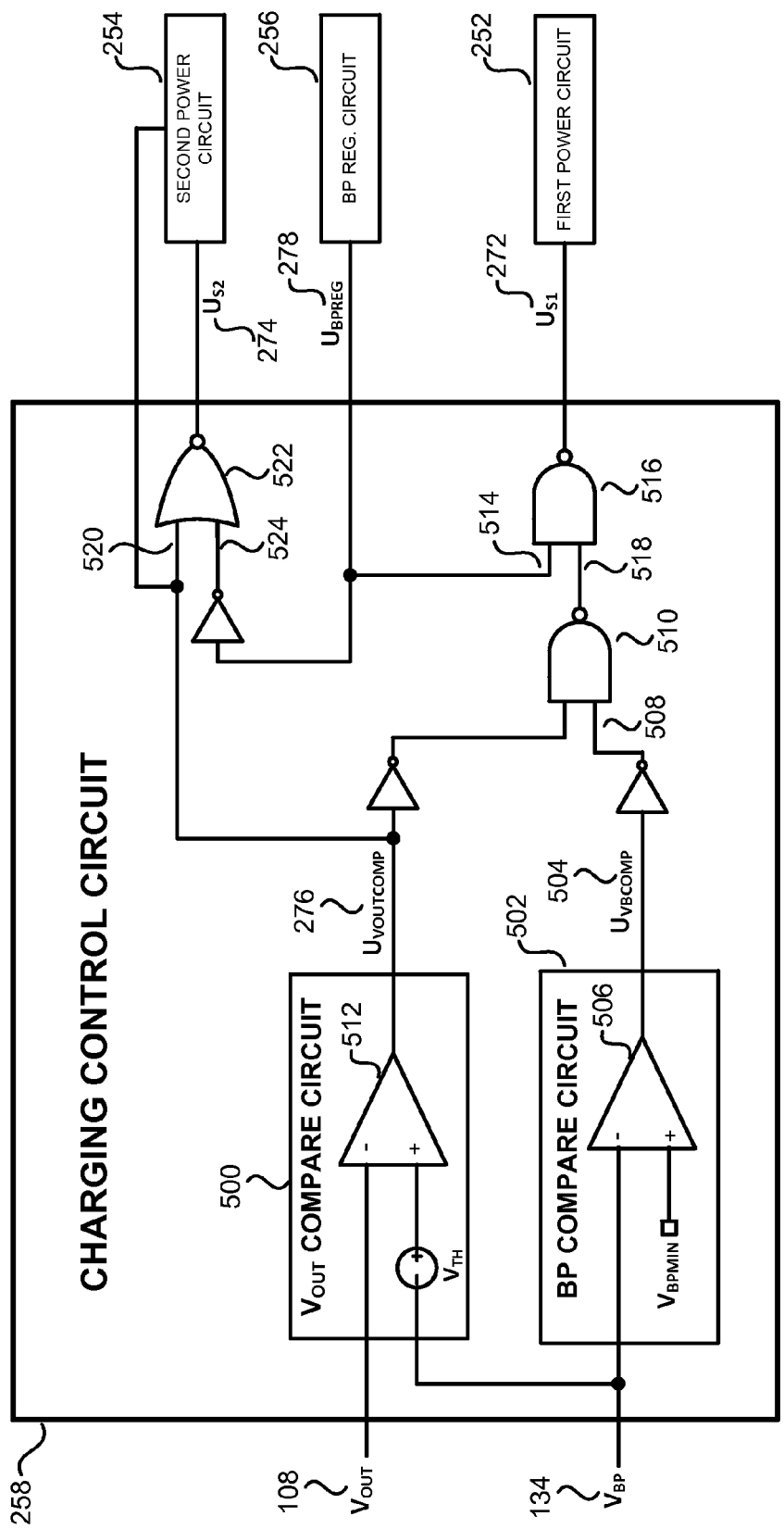
FIG. 5 is a schematic diagram of an example charging control circuit of the secondary controller according to the present disclosure.

FIG. 5 shows a functional block diagram of an example charging control circuit 258. Charging control circuit 258 includes an output voltage compare circuit 500, a bypass voltage compare circuit 502, and a plurality of logic gates. Charging control circuit 258 receives voltages $V_{OUT}$ 108 and $V_{BP}$ 134. Charging control circuit 258 also receives digital control signal $U_{BPREG}$ 278 from bypass regulation circuit 256. Charging control circuit 258 outputs digital control signal $U_{S1}$ 272 that controls the state of first power circuit 252. Charging control circuit 258 outputs digital control signals $U_{S2}$ 274 and $U_{VOUTCOMP}$ 276 that control the state of second power circuit 254.

In operation, bypass voltage compare circuit 502 receives bypass voltage $V_{BP}$ 134 and outputs logic control signal $U_{VBCOMP}$ 504 that indicates whether bypass voltage $V_{BP}$ 134 is greater than or less than minimum bypass voltage value $V_{BPMIN}$. If bypass voltage $V_{BP}$ 134 is greater than minimum bypass voltage value $V_{BPMIN}$, comparator 506 outputs a low $U_{VBCOMP}$ signal 504. If bypass voltage $V_{BP}$ 134 is less than minimum bypass voltage value $V_{BPMIN}$, comparator 506 outputs a high $U_{VBCOMP}$ signal 504. After startup, bypass voltage $V_{BP}$ 134 may typically remain above minimum bypass voltage value $V_{BPMIN}$. Accordingly, $U_{VBCOMP}$ 504 may typically be maintained at a logic low value and input 508 of NAND gate 510 is maintained at a logic high value. However, in circumstances when bypass voltage $V_{BP}$ 134 drops below minimum bypass voltage value $V_{BPMIN}$, $U_{VBCOMP}$ 504 may be driven to a logic high value and input 508 of NAND gate 510 is driven to a logic low value. In these circumstances, control signal $U_{BPREG}$ 278 would also have a logic high value because bypass voltage $V_{BP}$ 134 would be less than bypass regulation voltage value $V_{BPREG}$. Accordingly, control signal $U_{S1}$ 272 would be driven low to enable first power circuit 252 in circumstances when bypass voltage $V_{BP}$ 134 drops below minimum bypass voltage value $V_{BPMIN}$.

In operation, output voltage compare circuit 500 receives output voltage $V_{OUT}$ 108 and bypass voltage $V_{BP}$ 134 and outputs logic control signal $U_{VOUTCOMP}$ 276 that indicates whether output voltage $V_{OUT}$ 108 is greater than bypass voltage $V_{BP}$ 134 by a threshold voltage $V_{TH}$. If output voltage $V_{OUT}$ 108 is greater than bypass voltage $V_{BP}$ 134 by the threshold voltage $V_{TH}$, comparator 512 outputs a low $U_{VOUTCOMP}$ signal 276. If output voltage $V_{OUT}$ 108 is less than the sum of bypass voltage $V_{BP}$ 134 and the threshold voltage $V_{TH}$, comparator 512 outputs a high $U_{VOUTCOMP}$ signal 276.

As described above, first power circuit 252 may be enabled to charge bypass capacitor 130 at startup, before the logic gates of charging control circuit 258 are functioning as illustrated. First power circuit 252 may also be enabled during operation of power converter 100 when bypass voltage $V_{BP}$ 134 is less than bypass regulation voltage value $V_{BPREG}$ and output voltage $V_{OUT}$ 108 is less than the sum of bypass voltage $V_{BP}$ 134 and threshold voltage $V_{TH}$. In this scenario, second power circuit 254 is disabled, as described hereinafter, and input 514 to NAND gate 516 determines the state of control signal $U_{S1}$ 272 because input 518 of NAND gate 516 is a logic high. Put another way, in this scenario, $U_{BPREG}$ 278 controls the state of first power circuit 252. If bypass regulation circuit 256 determines that bypass voltage $V_{BP}$ 134 is less than bypass regulation voltage value $V_{BPREG}$, then bypass regulation circuit 256 outputs a logic control signal $U_{BPREG}$ 278 having a logic high value, which enables first power circuit 252 to charge bypass capacitor 130. If bypass regulation circuit 256 determines that bypass voltage $V_{BP}$ 134 is greater than bypass regulation voltage value $V_{BPREG}$, then bypass regulation circuit 256 outputs a logic control signal $U_{BPREG}$ 278 having a logic low value, which disables first power circuit 252 to prevent charging of bypass capacitor 130 from forward terminal FWD 228-4.

Second power circuit 254 may be enabled (i.e., $U_{S2}$ 274 is a logic high and $U_{VOUTCOMP}$ 276 is a logic low) to charge bypass capacitor 130 when output voltage $V_{OUT}$ 108 is greater than a threshold voltage $V_{TH}$ above bypass voltage $V_{BP}$ 134 (i.e., $U_{VOUTCOMP}$ 276 is a logic low). In this scenario, input 520 to NOR gate 522 is a logic low, meaning that input 524 to NOR gate 522 controls the state of $U_{S2}$ 274, and therefore, the state of second power circuit 254. If bypass regulation circuit 256 determines that bypass voltage $V_{BP}$ 134 is less than bypass regulation voltage value $V_{BPREG}$, then bypass regulation circuit 256 outputs a logic control signal $U_{BPREG}$ of logic high, which enables second power circuit 254 to charge bypass capacitor 130. If bypass regulation circuit 256 determines that bypass voltage $V_{BP}$ 134 is greater than bypass regulation voltage value $V_{BPREG}$, then bypass regulation circuit 256 outputs a logic control signal $U_{BPREG}$ of logic low, which disables second power circuit 254 to prevent charging of bypass capacitor 130 from output voltage terminal VOUT 228-8.

In one sense, during operation of power converter 100 after startup, $U_{VOUTCOMP}$ 276 acts as a selection signal that indicates which of first and second power circuits 252, 254 may be controlled by charging control circuit 258. With respect to first power circuit 252, since $U_{VBCOMP}$ 504 is typically a logic low, a $U_{VOUTCOMP}$ 276 having a logic high value results in the state of first power circuit 252 being under control of $U_{BPREG}$ 278. With respect to second power circuit 254, a $U_{VOUTCOMP}$ 276 having a low value results in the state of second power circuit 254 being under control of $U_{BPREG}$ 278. Accordingly, charging control circuit 258 may select which of first and second power circuits 252, 254 is to be controlled in response to the relative magnitudes of bypass voltage $V_{BP}$ 134 and output voltage $V_{OUT}$ 108. Charging control circuit 258 then enables/disables the selected power circuit in response to the magnitude of bypass voltage $V_{BP}$ 134 relative to bypass regulation voltage value $V_{BPREG}$. For example, charging control circuit 258 may enable the selected power circuit when bypass voltage $V_{BP}$ 134 is less than bypass regulation voltage value $V_{BPREG}$, and may disable the selected power circuit when bypass voltage $V_{BP}$ 134 is greater than bypass regulation voltage value $V_{BPREG}$, as described above.

Figure 6:
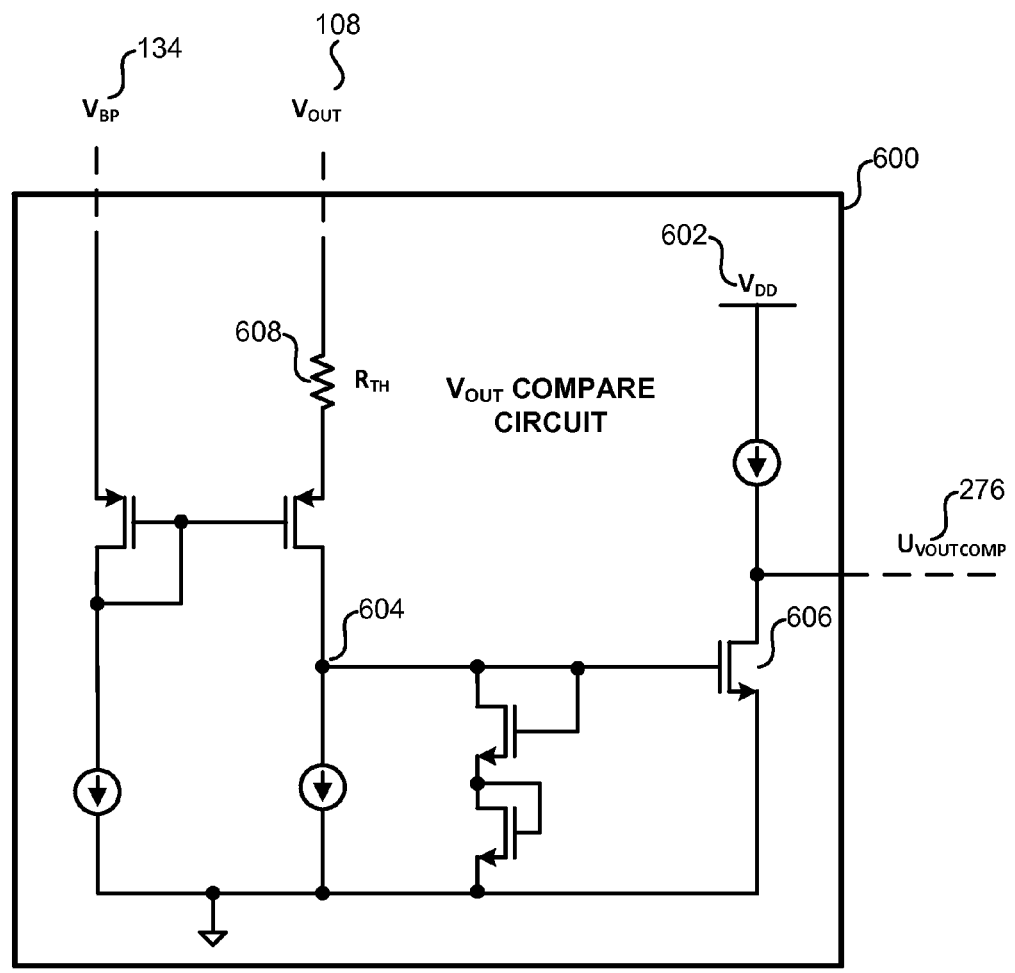
FIG. 6 is a schematic diagram of an example output voltage compare circuit of the charging control circuit according to the present disclosure.

FIG. 6 is a schematic diagram of an example output voltage ($V_{OUT}$) compare circuit 600. $V_{OUT}$ compare circuit 600 receives bypass voltage $V_{BP}$ 134 and output voltage $V_{OUT}$ 108, and outputs $U_{VOUTCOMP}$ 276. $V_{DD}$ 602 in $V_{OUT}$ compare circuit 600 may be a supply voltage that is derived from bypass voltage $V_{BP}$ 134. In FIG. 6, node 604 may be driven high (e.g., greater than a threshold voltage of MOSFET 606) when output voltage $V_{OUT}$ 108 is greater than bypass voltage $V_{BP}$ 134 by the threshold voltage $V_{TH}$. MOSFET 606 may be turned ON in response to node 604 being driven high, which in turn may set $U_{VOUTCOMP}$ 276 to a logic low level, as described above. In FIG. 6, node 604 may be pulled low (e.g., less than a threshold voltage of MOSFET 606) when output voltage $V_{OUT}$ 108 is not greater than the sum of bypass voltage $V_{BP}$ 134 and the threshold voltage $V_{TH}$. MOSFET 606 may be turned OFF in response to node 604 being pulled low, which in turn may set $U_{VOUTCOMP}$ 276 to a logic high level, as described above. The value of the resistor $R_{TH}$ 608 may be changed in order to change the threshold voltage $V_{TH}$ of $V_{OUT}$ compare circuit 600.

Figure 7:
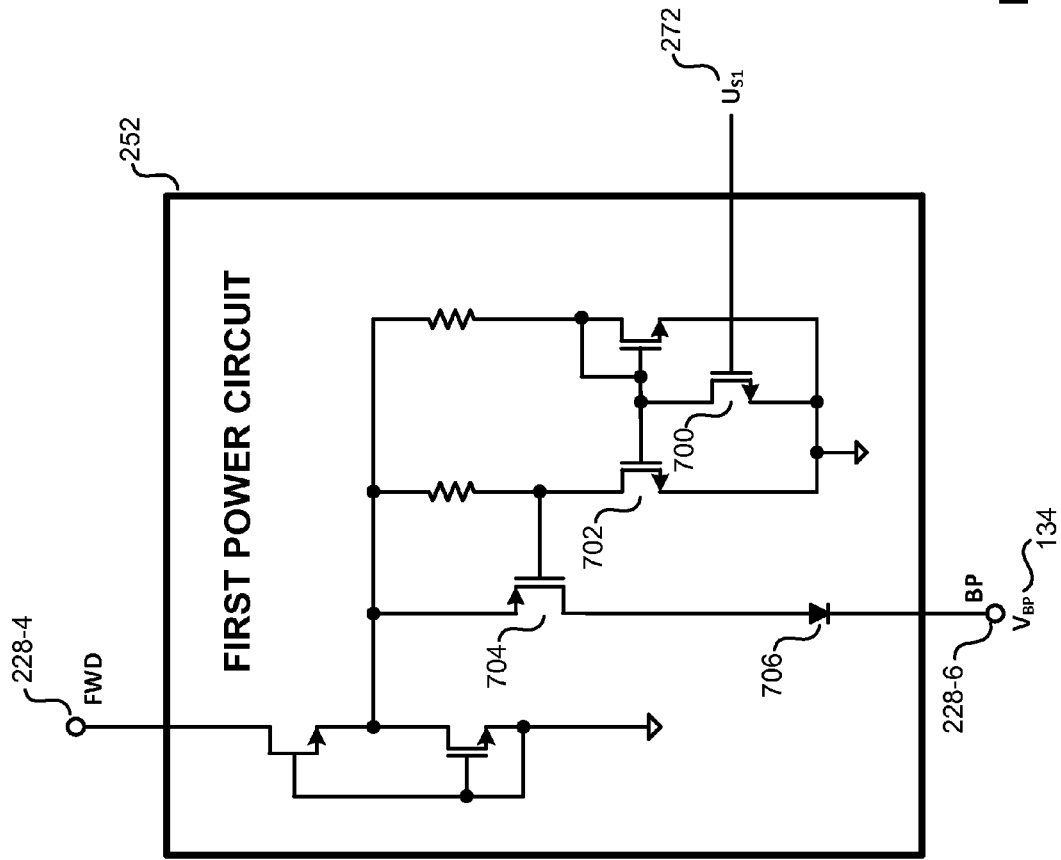
FIG. 7 is a schematic diagram of an example first power circuit of the secondary controller according to the present disclosure.

FIG. 7 is a schematic diagram of an example first power circuit 252. First power circuit 252 receives control signal $U_{S1}$ 272. First power circuit 252 is enabled to transfer charge from forward terminal FWD 228-4 to bypass terminal BP terminal 228-6 when $U_{S1}$ 272 is logic low. For example, if $U_{S1}$ 272 is a logic low, MOSFET 700 is turned OFF, MOSFET 702 is turned ON, and p-channel MOSFET 704 forms a conductive path for charging bypass capacitor 130 using forward voltage FWD 228-4 when the voltage at forward terminal FWD 228-4 is greater than bypass voltage $V_{BP}$ 134. Diode 706 may prevent transfer of charge from bypass terminal BP 228-6 to forward terminal FWD 228-4 when p-channel MOSFET 704 is ON. First power circuit 252 is disabled when $U_{S1}$ 272 is logic high. For example, if $U_{S1}$ 272 is logic high, MOSFET 700 is turned ON, MOSFET 702 is turned OFF, and p-channel MOSFET 704 is turned OFF, which disconnects forward terminal FWD 228-4 from bypass terminal BP 228-6.

Figure 8:
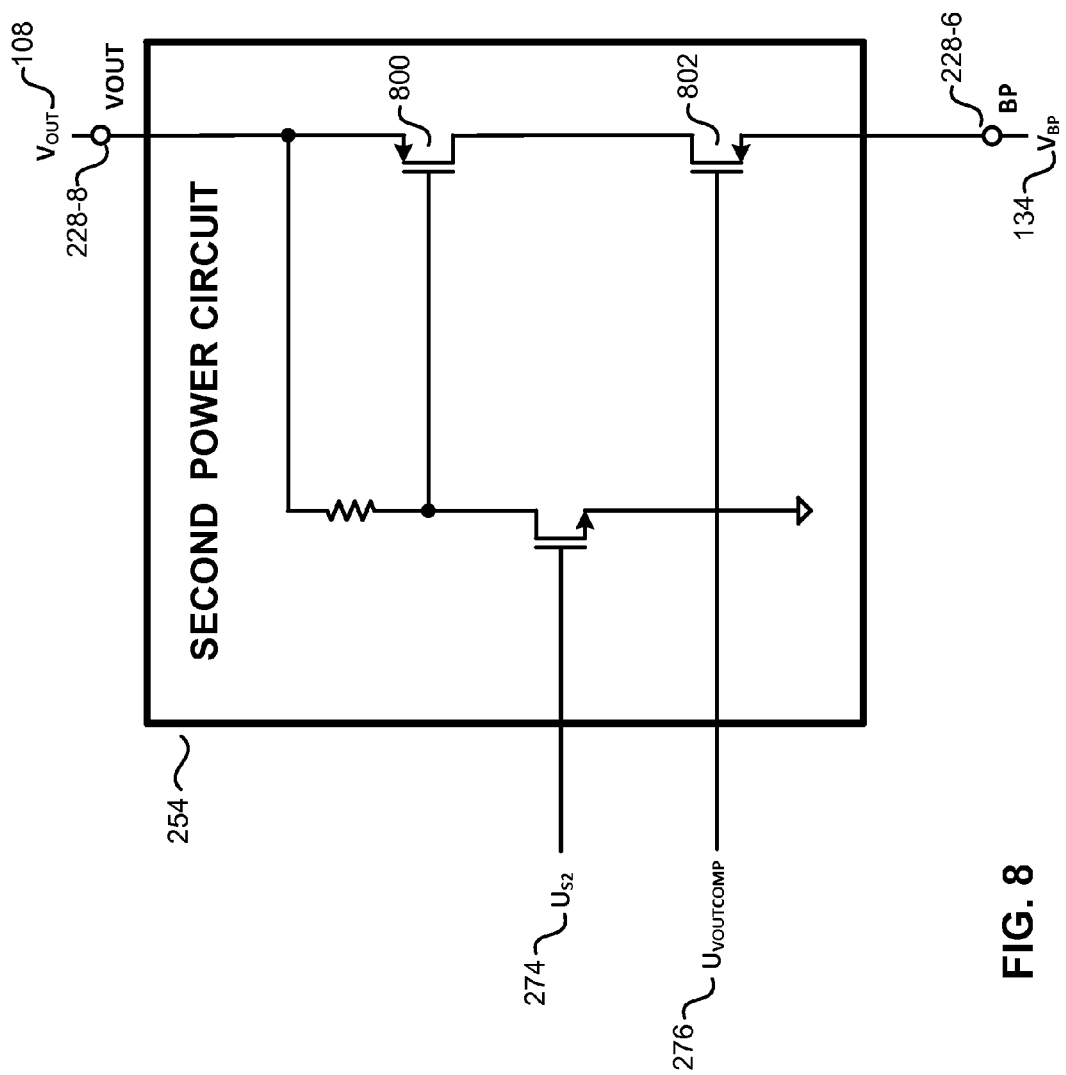
FIG. 8 is a schematic diagram of an example second power circuit of the secondary controller according to the present disclosure.
Figure 9:
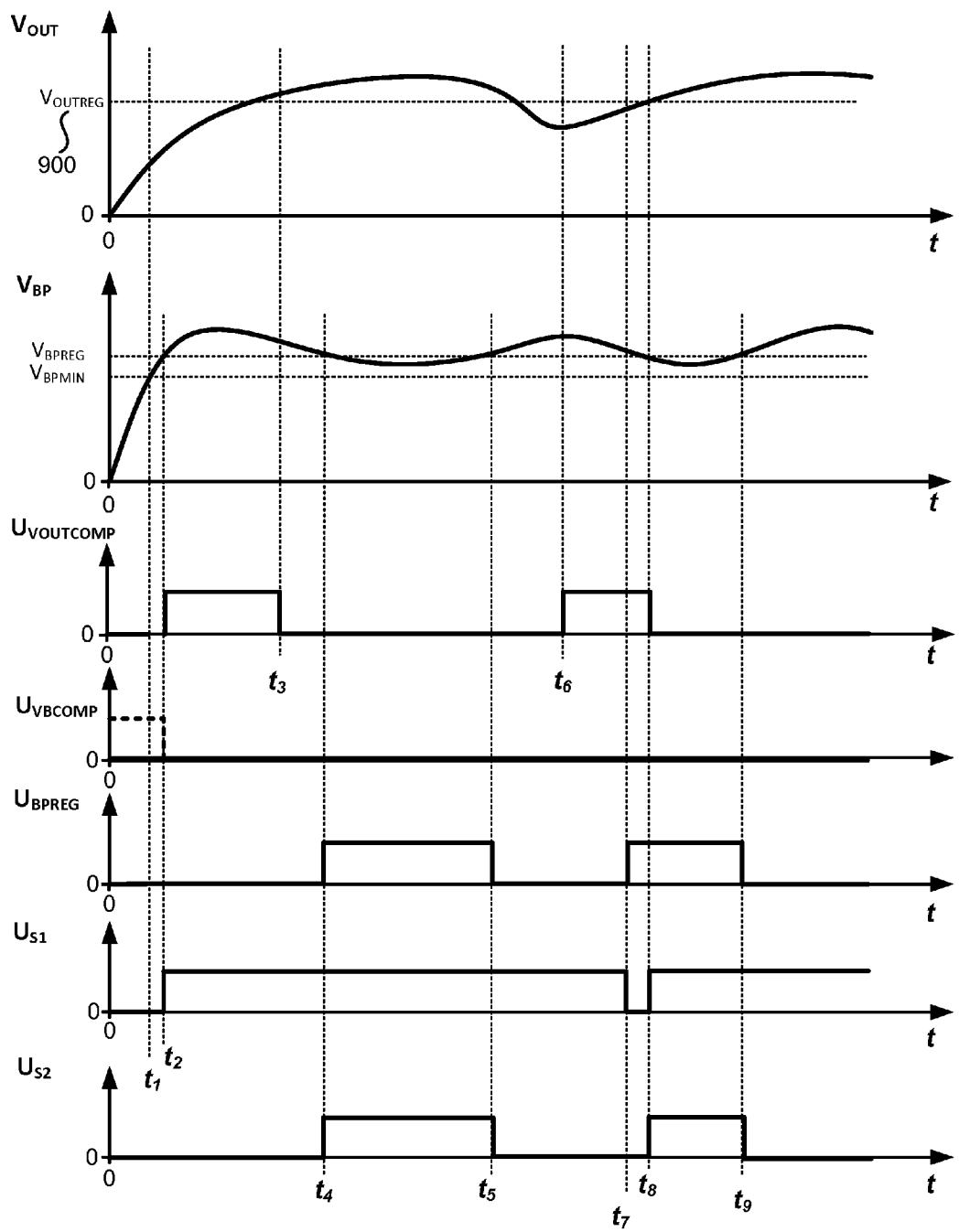
FIG. 9 shows example voltage waveforms of voltages across an output capacitor and a bypass capacitor of a power converter, along with timing diagrams for control signals that control charging of the bypass capacitor according to the present disclosure.

FIG. 8 is a schematic diagram of an example second power circuit 254. Second power circuit 254 receives a control signal $U_{S2}$ 274 and a control signal $U_{VOUTCOMP}$ 276. If $U_{VOUTCOMP}$ 276 is a logic low and $U_{S2}$ 274 is a logic high, then p-channel MOSFETs 800, 802 are ON and form a conductive path between output voltage terminal VOUT 228-8 and bypass terminal BP 228-6 so that bypass capacitor 130 may be charged from output voltage terminal $V_{OUT}$ 228-8. If $U_{VOUTCOMP}$ 276 is a logic high or $U_{S2}$ 274 is a logic low, then at least one of p-channel MOSFETs 800, 802 are turned OFF, which disconnects output voltage terminal VOUT 228-8 from bypass terminal BP 228-6.

FIG. 9 shows example output voltage $V_{OUT}$ 108 and bypass voltage $V_{BP}$ 134 waveforms along with timing diagrams for control signals $U_{VOUTCOMP}$ 276, $U_{VBCOMP}$ 504, $U_{BPREG}$ 278, $U_{S1}$ 272, and $U_{S2}$ 274 during and after startup of power converter 100. Time (t) is along the x-axis. It may be assumed that before time 0, bypass capacitor 130 and output capacitor 110 may be fully discharged so that bypass voltage $V_{BP}$ 134 and output voltage $V_{OUT}$ 108 are both substantially zero volts.

At time 0, input voltage $V_{IN}$ 106 is provided at input terminals 102 and primary controller 218 starts switching the state of power switch 222 to transfer energy to the secondary side. Bypass capacitor 130 and output capacitor 110 may begin charging. For example, first power circuit 252 may be initially enabled to charge bypass voltage $V_{BP}$ 134 at time 0. In the example waveforms illustrated in FIG. 9, output capacitor 110 may tend to develop voltage at a lower rate than bypass capacitor 130. Accordingly, bypass voltage $V_{BP}$ 134 may reach minimum bypass voltage value $V_{BPMIN}$ prior to output voltage $V_{OUT}$ 108 reaching the desired regulated output voltage $V_{OUTREG}$ 900. Although FIG. 9 illustrates an example in which output capacitor 110 develops voltage at a lower rate than bypass capacitor 130, in other examples, output capacitor 110 may develop voltage at a higher rate than bypass capacitor 130.

At time $t_1$, bypass voltage $V_{BP}$ 134 reaches minimum bypass voltage value $V_{BPMIN}$. From time $t_1$ to $t_2$, first power circuit 252 may be enabled to charge bypass voltage $V_{BP}$ 134 up to bypass regulation voltage value $V_{BPREG}$. At time $t_2$, bypass voltage $V_{BP}$ 134 reaches bypass regulation voltage value $V_{BPREG}$ and circuits of secondary controller 220 that are powered by bypass capacitor 130 may begin operating, as described above. $U_{VBCOMP}$ 504 may assume a logic low value at $t_2$ because bypass voltage $V_{BP}$ 134 is greater than minimum bypass voltage value $V_{BPMIN}$. In FIG. 9, bypass voltage $V_{BP}$ 134 is maintained at a level that is greater than minimum bypass voltage value $V_{BPMIN}$. Accordingly, $U_{VBCOMP}$ 504 is maintained at a logic low value after $t_2$ in FIG. 9. In examples where bypass voltage $V_{BP}$ 134 drops below minimum bypass voltage value $V_{BPMIN}$, $U_{VBCOMP}$ 504 may be driven to a logic high value, which may result in the charging of bypass capacitor 130 using first power source 252, as described above.

Bypass voltage $V_{BP}$ 134 is at a bypass regulation voltage value $V_{BPREG}$ at $t_2$. From $t_2$-$t_3$, first power circuit 252 is disabled because bypass voltage $V_{BP}$ 134 is greater than bypass regulation voltage value $V_{BPREG}$. At $t_3$, output voltage $V_{OUT}$ 108 reaches the desired output regulation voltage $V_{OUTREG}$ 900. At $t_3$, $U_{VOUTCOMP}$ 276 transitions to logic low when output voltage $V_{OUT}$ 108 has reached a value that is a threshold voltage $V_{TH}$ greater than bypass voltage $V_{BP}$ 134. At $t_3$, second power circuit 254 remains disabled because bypass voltage $V_{BP}$ 134 is still greater than bypass regulation voltage value $V_{BPREG}$. From $t_3$-$t_4$, both first and second power circuits 252, 254 are disabled.

At $t_4$, bypass voltage $V_{BP}$ 134 drops to a value that is less than bypass regulation voltage value $V_{BPREG}$. Accordingly, $U_{BPREG}$ 278 is driven high and second power circuit 254 charges bypass capacitor 130. Second power circuit 254 charges bypass capacitor 130 from $t_4$ to $t_5$ until bypass voltage $V_{BP}$ 134 reaches bypass regulation voltage value $V_{BPREG}$. At $t_5$, second power circuit 254 is disabled when $U_{BPREG}$ 278 is driven to a logic low value.

Just prior to $t_6$, output voltage $V_{OUT}$ 108 decreases in magnitude. At $t_6$, output voltage $V_{OUT}$ 108 is at a value that is less than the sum of the threshold voltage $V_{TH}$ and bypass voltage $V_{BP}$ 134. Accordingly, at $t_6$, $U_{VOUTCOMP}$ 276 is driven to logic high, which disables second power circuit 254. At $t_6$, bypass voltage $V_{BP}$ 134 is greater than minimum bypass voltage value $V_{BPMIN}$, so both first and second power circuits 252, 254 are disabled.

At $t_7$, bypass voltage $V_{BP}$ 134 drops below bypass regulation voltage value $V_{BPREG}$, which causes $U_{BPREG}$ 278 to be driven to logic high, which enables first power circuit 252 to charge bypass capacitor 130 from forward terminal FWD 228-4 from $t_7$ to $t_8$. At $t_8$, output voltage $V_{OUT}$ 108 reaches a value that is greater than bypass value $V_{BP}$ 134 plus the threshold voltage $V_{TH}$. At $t_8$, bypass voltage $V_{BP}$ 134 is also less than bypass regulation voltage value $V_{BPREG}$. Accordingly, second power circuit 254 is enabled to charge bypass capacitor 130 at $t_8$. Second power circuit 254 continues to charge bypass capacitor 130 from $t_8$-$t_9$ until bypass voltage $V_{BP}$ 134 reaches bypass regulation voltage value $V_{BPREG}$.

The above description of illustrated examples of the present invention, including what is described in the Abstract, are not intended to be exhaustive or to be limiting to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, times, etc., are provided for explanation purposes and that other values may also be employed in other embodiments and examples in accordance with the teachings of the present disclosure.

What is claimed is:

1. A controller for use in an isolated power converter having an energy transfer element for transferring energy between a primary side and a secondary side of the power converter, the controller comprising:

a bypass terminal to be coupled to a bypass capacitor included in and coupled to the secondary side of the isolated power converter;

a first power circuit coupled between the bypass terminal and a first terminal, wherein the first terminal is to be coupled to receive charge from a secondary winding of the energy transfer element on the secondary side, and wherein the first power circuit is coupled between the bypass terminal and the first terminal to transfer the charge from the first terminal to the bypass terminal for storage on the bypass capacitor;
a second power circuit coupled between the bypass terminal and a second terminal, wherein the second terminal is to be coupled to receive charge from an output of the power converter on the secondary side, and wherein the second power circuit is coupled between the bypass terminal and the second terminal to transfer the charge from the second terminal to the bypass terminal for storage on the bypass capacitor; and
a charging control circuit coupled to control which of the first and second power circuits transfers charge to the bypass terminal in response to at least one of a bypass voltage developed at the bypass terminal and a voltage at the second terminal.

2. The controller of claim 1, wherein the voltage at the second terminal is a regulated output voltage.

3. The controller of claim 1, wherein the charging control circuit is coupled to control which of the first and second power circuits transfers charge to the bypass terminal in response to a comparison between the bypass voltage and the voltage at the second terminal.

4. The controller of claim 1, wherein the charging control circuit is coupled to disable the first power circuit to disconnect the bypass terminal from the first terminal, and wherein the charging control circuit is coupled to enable the first power circuit to transfer charge from the first terminal to the bypass terminal.

5. The controller of claim 1, wherein the charging control circuit is coupled to disable the second power circuit to disconnect the bypass terminal from the second terminal, and wherein the charging control circuit is coupled to enable the second power circuit to transfer charge from the second terminal to the bypass terminal.

6. The controller of claim 1, further comprising a bypass regulation circuit coupled to sense the bypass voltage, determine whether the bypass voltage is less than a regulation voltage, and indicate to the charge control circuit whether the bypass voltage is less than the regulation voltage, wherein the charge control circuit is coupled to control at least one of the first and second power circuits to transfer charge to the bypass terminal when the bypass voltage is less than the regulation voltage.

7. The controller of claim 1, wherein the charging control circuit is coupled to disable the first power circuit when the voltage at the second terminal is greater than the bypass voltage by a threshold voltage value, wherein the first power circuit blocks the transfer of charge from the first terminal to the bypass terminal when the first power circuit is disabled, and wherein the charging control circuit is coupled to enable the second power circuit to transfer charge from the second terminal to the bypass terminal when the voltage at the second terminal is greater than the bypass voltage by the threshold voltage value.

8. The controller of claim 1, wherein the charging control circuit is coupled to disable the second power circuit when the voltage at the second terminal is less than a sum of the bypass voltage and a threshold voltage value, wherein the second power circuit blocks the transfer of charge from the second terminal to the bypass terminal when the second power circuit is disabled, and wherein the charging control circuit is coupled to enable the first power circuit to transfer charge from the first terminal to the bypass terminal when the voltage at the second terminal is less than the sum of the bypass voltage and the threshold voltage value.

9. The controller of claim 1, wherein the charging control circuit includes a plurality of logic gates, and wherein the first power circuit is coupled to transfer charge from the first terminal to the bypass terminal when the bypass voltage is less than or equal to a minimum operating voltage of the plurality of logic gates.

10. The controller of claim 1, further comprising a secondary switching circuit coupled to transmit a signal to a primary side of the isolated power converter, wherein the secondary switching circuit is coupled to receive operating power from the bypass terminal.

11. The controller of claim 1, further comprising a secondary switching circuit coupled to communicate a control signal to a primary-side controller on the primary side of the power converter via a communication link, wherein the primary-side controller controls a state of a power switch included in the primary side in response to the control signal to regulate the transfer of energy from the primary side to the secondary side of the power converter.

12. An integrated circuit package for use in an isolated power converter having an energy transfer element for transferring energy between a primary side and a secondary side of the power converter, the integrated circuit package comprising:
a secondary controller comprising:
a first terminal, a second terminal, and a bypass terminal, wherein the bypass terminal is to be coupled to a bypass capacitor included in and coupled to a secondary side of an isolated power converter;
a first power circuit coupled between the bypass terminal and the first terminal to transfer charge from the first terminal to the bypass terminal for storage on the bypass capacitor, wherein the first terminal is to be coupled to receive the charge from a secondary winding of the energy transfer element on the secondary side;
a second power circuit coupled between the bypass terminal and the second terminal to transfer charge from the second terminal to the bypass terminal for storage on the bypass capacitor, wherein the second terminal is to be coupled to receive the charge from an output of the power converter on the secondary side;
a charging control circuit coupled to control which of the first and second power circuits transfers charge to the bypass terminal in response to at least one of a bypass voltage developed at the bypass terminal and a voltage at the second terminal; and
a secondary switching circuit coupled to transmit a signal to a primary side of the isolated power converter;
a primary controller coupled to receive the transmitted signal and control a power switch in response to the transmitted signal to regulate the transfer of energy from the primary side to the secondary side of the power converter; and
an encapsulation, wherein the primary controller and the secondary controller are disposed within the encapsulation.

13. The integrated circuit package of claim 12, wherein the primary controller and the secondary controller are galvanically isolated from one another.

14. The integrated circuit package of claim 12, further comprising the power switch, wherein the power switch is disposed within the encapsulation.

15. The integrated circuit package of claim 12, further comprising a lead frame, wherein the secondary switching circuit is coupled to transmit the signal to the primary controller via the lead frame.

16. A power converter comprising:
an energy transfer element comprising a primary winding on a primary side of the power converter and a secondary winding on a secondary side of the power converter;
a bypass capacitor included in and coupled to the secondary side of the power converter;
a power switch coupled to the primary winding;
a secondary controller comprising:
- a first power circuit coupled to transfer charge received from the secondary winding of the energy transfer element to the bypass capacitor;
- a second power circuit coupled to transfer charge received from an output of the power converter to the bypass capacitor;
- a charging control circuit coupled to control which of the first and second power circuits transfers charge to the bypass capacitor in response to at least one of a bypass voltage developed across the bypass capacitor and a secondary winding voltage; and
- a secondary switching circuit coupled to transmit a signal to the primary side of the isolated power converter; and
a primary controller coupled to receive the transmitted signal and control a state of the power switch in response to the transmitted signal.

17. The power converter of claim 16, wherein the output of the power converter is coupled to deliver a regulated output voltage.

18. A method for controlling an isolated power converter, the method comprising:
transferring charge from a first terminal to a bypass terminal for storage on a bypass capacitor coupled to a secondary side of the isolated power converter, wherein the first terminal is to be coupled to receive the charge from a secondary winding of an energy transfer element on the secondary side, and wherein a first power circuit coupled between the first terminal and the bypass terminal transfers the charge;
transferring charge from a second terminal to the bypass terminal for storage on the bypass capacitor, wherein the second terminal is to be coupled to receive the charge from an output of the power converter on the secondary side, and wherein a second power circuit coupled between the second terminal and the bypass terminal transfers the charge; and
controlling the transfer of charge to the bypass terminal in response to at least one of a bypass voltage developed at the bypass terminal and a voltage at the second terminal.

19. The method of claim 18, further comprising controlling the transfer of charge to the bypass terminal in response to a comparison between the bypass voltage and the voltage at the second terminal.

20. The method of claim 18, further comprising:
sensing the bypass voltage;
determining whether the bypass voltage is less than a regulation voltage; and
transferring charge to the bypass terminal when the bypass voltage is less than the regulation voltage.

21. The method of claim 18, further comprising:
disconnecting the bypass terminal from the first terminal when the voltage at the second terminal is greater than the bypass voltage by a threshold voltage value; and
transferring charge from the second terminal to the bypass terminal when the voltage at the second terminal is greater than the bypass voltage by the threshold voltage value.

22. The method of claim 18, further comprising:
disconnecting the bypass terminal from the second terminal when the voltage at the second terminal is less than a sum of the bypass voltage and a threshold voltage value; and
transferring charge from the first terminal to the bypass terminal when the voltage at the second terminal is less than the sum of the bypass voltage and the threshold voltage value.

* * * * *